United States Patent
Xiong et al.

(10) Patent No.: US 9,844,118 B1
(45) Date of Patent: Dec. 12, 2017

(54) AC LED DRIVER CIRCUIT

(71) Applicant: Universal Lighting Technologies, Inc., Madison, AL (US)

(72) Inventors: Wei Xiong, Madison, AL (US); Travis L. Berry, Madison, AL (US); Keith Davis, Madison, AL (US); Christopher Radzinski, Huntsville, AL (US)

(73) Assignee: UNIVERSAL LIGHTING TECHNOLOGIES, INC., Madison, AL (US)

( * ) Notice: Subject to any disclaimer, the term of this patent is extended or adjusted under 35 U.S.C. 154(b) by 0 days.

(21) Appl. No.: 15/362,260

(22) Filed: Nov. 28, 2016

Related U.S. Application Data

(60) Provisional application No. 62/290,221, filed on Feb. 2, 2016.

(51) Int. Cl.
*H05B 33/08* (2006.01)

(52) U.S. Cl.
CPC ....... *H05B 33/089* (2013.01); *H05B 33/0809* (2013.01); *H05B 33/0827* (2013.01)

(58) Field of Classification Search
CPC .............. H05B 33/089; H05B 33/0809; H05B 33/0827
USPC ........................................................ 315/122
See application file for complete search history.

(56) References Cited

U.S. PATENT DOCUMENTS

| | | | | |
|---|---|---|---|---|
| 7,081,722 B1* | 7/2006 | Huynh | ............... | H05B 33/0818 315/185 S |
| 8,907,583 B1* | 12/2014 | Huang | ................. | H05B 33/083 315/185 R |
| 9,041,303 B2* | 5/2015 | Yoon | ................... | H05B 33/0821 315/192 |
| 9,210,757 B2* | 12/2015 | Tao | ..................... | H05B 33/0815 |
| 9,320,099 B2* | 4/2016 | Leung | ................. | H05B 33/083 |
| 9,572,210 B2* | 2/2017 | Kim | ..................... | H05B 33/083 |
| 2010/0164403 A1* | 7/2010 | Liu | ....................... | H05B 33/086 315/297 |
| 2010/0194298 A1* | 8/2010 | Kuwabara | ............ | H05B 33/083 315/186 |
| 2011/0248648 A1* | 10/2011 | Liu | ....................... | G09G 3/3406 315/294 |
| 2012/0280622 A1* | 11/2012 | Jeong | ................... | H05B 33/083 315/122 |
| 2013/0043799 A1* | 2/2013 | Siu | ...................... | H05B 33/0824 315/193 |

(Continued)

*Primary Examiner* — Dylan White
(74) *Attorney, Agent, or Firm* — Patterson Intellectual Property Law, P.C.; Mark J. Patterson; Gary L. Montle

(57) ABSTRACT

An LED driver circuit controls the currents through a plurality of strings of light-emitting diodes (LEDs), which are connected in series. Each LED string has an associated current regulator. The LED strings are connected between the voltage rail and a reference rail on the output of an AC-to-DC rectifier to receive an unfiltered rectified DC voltage. A first current regulator is active during a first voltage range of the DC voltage to provide a current of a first magnitude to a first LED string only. A second current regulator is active during a second voltage range to provide a current of a second magnitude to the first LED string and to a second LED string. A third current regulator is active during a third voltage range to provide a current of a third magnitude to the first LED string, to the second LED string and to a third LED string.

20 Claims, 5 Drawing Sheets

(56) References Cited

U.S. PATENT DOCUMENTS

| | | | |
|---|---|---|---|
| 2013/0271041 A1* | 10/2013 | Chiu | H05B 33/0851 315/308 |
| 2014/0125230 A1* | 5/2014 | Shteynberg | H05B 33/083 315/122 |
| 2014/0184078 A1* | 7/2014 | Hwang | H05B 33/083 315/122 |
| 2014/0361696 A1* | 12/2014 | Siessegger | H05B 33/0803 315/186 |
| 2015/0373792 A1* | 12/2015 | Kim | H05B 33/0824 315/201 |
| 2015/0382420 A1* | 12/2015 | Sakai | H05B 33/0803 315/193 |
| 2016/0014860 A1* | 1/2016 | Yoo | H05B 33/0824 315/191 |
| 2016/0037594 A1* | 2/2016 | Yamahara | H05B 33/083 315/187 |
| 2016/0143096 A1* | 5/2016 | Lin | H05B 37/02 315/121 |

* cited by examiner

AC LED DRIVER CIRCUIT

CROSS-REFERENCES TO RELATED APPLICATIONS

This application claims benefit of the following patent application which is hereby incorporated by reference: U.S. Provisional Patent App. No. 62/290,221 filed Feb. 2, 2016, entitled "AC LED Driver Circuit."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The usage of light-emitting diodes (LEDs) to provide illumination is increasing rapidly as the costs of LEDs decrease and the endurances of the LEDs increase to cause the overall effective cost of operating LED lighting products to be lower than incandescent lamps and fluorescent lamps providing equivalent illumination. A typical LED driver is a switching power supply that uses a DC-DC converter to regulate the LED current. The components required for a switching power supply are costly. To avoid using a switching power supply, an LED driver that operates directly from the AC input would be desirable. Such a device would be compact and low cost; however, heretofore, LED drivers operating directly from the AC input have required complicated current control circuits. Also, such LED drivers have not effectively solved the problem of turn-on inrush current and overvoltage surges, which can damage the LEDs.

SUMMARY OF THE INVENTION

In view of the foregoing, an LED driver circuit driven directly from an AC input having inherent current limiting capability and having a high power factor is desirable. One aspect of the invention disclosed herein is an LED driver circuit that meets these criteria. The LED driver circuit controls the currents through a plurality of strings of LEDs, which are connected in series. Each LED string has an associated current regulator. The LED strings are connected between the voltage rail and a reference rail on the output of an AC-to-DC rectifier to receive an unfiltered rectified DC voltage. A first current regulator is active during a first voltage range of the DC voltage to provide a current of a first magnitude to a first LED string only. A second current regulator is active during a second voltage range to provide a current of a second magnitude to the first LED string and to a second LED string. A third current regulator is active during a third voltage range to provide a current of a third magnitude to the first LED string, to the second LED string and to a third LED string Another aspect of the invention disclosed herein is an LED driver circuit that includes a rectifier circuit that receives an AC voltage and that produces a rectified DC voltage. The rectified DC voltage has a sinusoidal magnitude during each half-cycle of the AC voltage. The rectified DC voltage is produced between a voltage rail and a reference rail. The LED driver circuit includes at least a first LED string comprising a first plurality of light-emitting diodes (LEDs) and a second LED string comprising a second plurality of LEDs. The first LED string has a respective first terminal connected to the voltage rail and has a respective second terminal. The second LED string has a respective first terminal connected to the second terminal of the first LED string and has a respective second terminal. A first current regulator has a respective first terminal connected to the second terminal of the first LED string and has a respective second terminal connected to the reference rail. The first current regulator is operable when the rectified DC voltage has a magnitude within a first voltage range to enable a first current having a first current magnitude to flow from the second terminal of the first LED string to the reference rail. The first current flows through the first LED string and does not flow through the second LED string. A second current regulator has a respective first terminal connected to the second terminal of the second LED string and has a respective second terminal connected to the reference rail. The second current regulator is operable when the rectified DC voltage has a magnitude within a second voltage range to enable a second current having a second current magnitude to flow from the second terminal of the second LED string to the reference rail. The second current flows through the first LED string and also flows through the second LED string.

In certain embodiments in accordance with this aspect, the first voltage range has a first voltage magnitude and a second voltage magnitude, wherein the second voltage magnitude is greater than the first voltage magnitude. The second voltage range has a third voltage magnitude and a fourth voltage magnitude, wherein the fourth voltage magnitude is greater than the third voltage magnitude, the third voltage magnitude greater than the second voltage magnitude of the first voltage range. In certain embodiments, the LED driver circuit further includes at least a third LED string. The third LED string has a third plurality of LEDs. The third LED string has a respective first terminal connected to the second terminal of the second LED string and has a respective second terminal. A third current regulator has a respective first terminal connected to the second terminal of the third LED string and has a respective second terminal connected to the reference rail. The third current regulator is operable when the rectified DC voltage has a magnitude within a third voltage range to enable a third current having a third current magnitude to flow from the second terminal of the third LED string to the reference rail. The third current flows through the first LED string, through the second LED string and through the third LED string. The third voltage range has a fifth voltage magnitude and a sixth voltage magnitude, wherein the sixth voltage magnitude is greater than the fifth voltage magnitude, and wherein the fifth voltage magnitude greater than the fourth voltage magnitude of the second voltage range.

In certain embodiments in accordance with this aspect, a lowest magnitude voltage in the second voltage range is greater than a highest voltage magnitude in the first voltage range. In certain embodiments, the LED driver circuit further includes at least a third LED string. The third LED string has a third plurality of LEDs. The third LED string has a respective first terminal connected to the second terminal of the second LED string and has a respective second terminal. A third current regulator has a respective first terminal connected to the second terminal of the third LED string and has a respective second terminal connected to the reference rail. The third current regulator is operable when the rectified DC voltage has a magnitude within a third voltage range to enable a third current to flow from the second terminal of the third LED string to the reference rail. The third current flows through the first LED string, through the second LED string and through the third LED string. A lowest voltage magnitude in the third voltage range is greater than a highest voltage magnitude in the second voltage range.

In certain embodiments in accordance with this aspect, the second current magnitude is greater than the first current magnitude. In certain embodiments, the LED driver circuit further includes at least a third LED string. The third LED string has a third plurality of LEDs. The third LED string has a respective first terminal connected to the second terminal of the second LED string and has a respective second terminal. A third current regulator has a respective first terminal connected to the second terminal of the third LED string and has a respective second terminal connected to the reference rail. The third current regulator is operable when the rectified DC voltage has a magnitude within a third voltage range to enable a third current having a third current magnitude to flow from the second terminal of the third LED string to the reference rail. The third current flows through the first LED string, through the second LED string and through the third LED string. The third current magnitude is greater than the second current magnitude.

In certain embodiments in accordance with this aspect, the first voltage range and the second voltage range are non-overlapping. When the magnitude of the rectified DC voltage is increasing, the first current regulator disables the first current through the first LED string before the second current regulator enables the second current through the first LED string and through the second LED string. In certain embodiments, the LED driver circuit further includes at least a third LED string. The third LED string has a third plurality of LEDs. The third LED string has a respective first terminal connected to the second terminal of the second LED string and has a respective second terminal. A third current regulator has a respective first terminal connected to the second terminal of the third LED string and has a respective second terminal connected to the reference rail. The third current regulator is operable when the rectified DC voltage has a magnitude within a third voltage range to enable a third current having a third magnitude to flow from the second terminal of the third LED string to the reference rail. The third current flows through the first LED string, through the second LED string and through the third LED string. The second voltage range and the third voltage range are non-overlapping. When the magnitude of the rectified DC voltage is increasing, the second current regulator disables the second current before the third current regulator enables the third current.

In certain embodiments in accordance with this aspect, the LED driver circuit includes at least a third LED string. The third LED string has a third plurality of LEDs. The third LED string has a respective first terminal connected to the second terminal of the second LED string and has a respective second terminal. A third current regulator has a respective first terminal connected to the second terminal of the third LED string and has a respective second terminal connected to the reference rail. The third current regulator is operable when the rectified DC voltage has a magnitude within a third voltage range to enable a third current to flow from the second terminal of the third LED string to the reference rail. The third current flows through the first LED string, through the second LED string and through the third LED string.

In certain embodiments in accordance with this aspect, the first current regulator has a first constant current source that provides a current substantially proportional to the first current magnitude. The first current regulator further includes a first transistor connected between the second terminal of the first LED string and the reference rail. The first transistor forms the output of a first current mirror. The first transistor is coupled to an input of the first current mirror. The input of the first current mirror is coupled to the first constant current source. A first voltage sensor is coupled between the second terminal of the first LED string and the reference rail. The first voltage sensor has an output coupled to a control terminal of the first transistor. The first voltage sensor turns off the first transistor to cease the flow of the first current when the magnitude of the rectified DC voltage is greater than a highest voltage of the first voltage range. In certain embodiments, the second current regulator includes a second constant current source that provides a current substantially proportional to the second current magnitude. The second current regulator further includes a second transistor connected between the second terminal of the second LED string and the reference rail. The second transistor forms the output of a second current mirror. The second transistor is coupled to an input of the second current mirror. The input of the second current mirror is coupled to the second constant current source. A second voltage sensor is coupled between the second terminal of the second LED string and the reference rail. The second voltage sensor has an output coupled to a control terminal of the second transistor. The second voltage sensor turns off the second transistor to cease the flow of the second current when the magnitude of the rectified DC voltage is greater than a highest voltage of the second voltage range.

Another aspect of the embodiments disclosed herein is a method of controlling the current through a plurality of LEDs connected as at least a first LED string and a second LED string wherein each LED string has a respective first terminal and a respective second terminal. The method includes rectifying an AC input voltage to produce a rectified DC voltage having a sinusoidal magnitude during each half cycle of the AC voltage. The rectified DC voltage is produced between a voltage rail and a reference rail. The method includes connecting the first terminal of the first LED string to the voltage rail, and connecting the first terminal of the second LED string to the second terminal of the first LED string. The method includes operating a first current regulator between the second terminal of the first LED string and the reference rail to enable a first current having a first current magnitude to flow from the second terminal of the first LED string to the reference rail when the rectified DC voltage has a magnitude within a first voltage range. The first current flows through the first LED string and does not flow through the second LED string. The method further includes operating a second current regulator between the second terminal of the second LED string and the reference rail to enable a second current having a second current magnitude to flow from the second terminal of the second LED string to the reference rail when the rectified DC voltage has a magnitude within a second voltage range. The second current flows through the first LED string and also flows through the second LED string.

In certain embodiments in accordance with this aspect, the plurality of LEDs further includes a third LED string having a respective first terminal and a respective second terminal. The method further includes connecting the first terminal of the third LED string to the second terminal of the second LED string. The method further includes operating a third current regulator between the second terminal of the third LED string and the reference rail to enable a third current having a third current magnitude to flow from the second terminal of the third LED string to the reference rail when the rectified DC voltage has a magnitude within a third voltage range. The third current flows through the first LED string, through the second LED string and through the third LED string.

Another aspect of the embodiments disclosed herein is an LED driver circuit comprising a rectifier circuit that receives an AC voltage and that produces a rectified DC voltage. The rectified DC voltage is produced between a voltage rail and a reference rail. The rectified DC voltage varies sinusoidally between a minimum magnitude and a maximum magnitude during each half-cycle of the AC voltage. The LED driver circuit includes at least a first LED string, a second LED string and a third LED string. Each LED string has a respective plurality of LEDs. The first LED string has a respective first terminal connected to the voltage rail and has a respective second terminal. The second LED string has a respective first terminal connected to the second terminal of the first LED string and has a respective second terminal. The third LED string has a respective first terminal connected to the second terminal of the second LED string and has a respective second terminal. The LED driver circuit further includes a first current regulator, a second current regulator and a third current regulator. Each current regulator has a respective first terminal and a respective second terminal. Each second terminal of each current regulator is connected to the reference rail. The first terminal of the first current regulator is connected to the second terminal of the first LED string. The first terminal of the second current regulator is connected to the second terminal of the second LED string. The first terminal of the third current regulator is connected to the second terminal of the third LED string. The first current regulator is responsive to the rectified DC voltage having a magnitude within a first voltage range to cause a first current having a first current magnitude to flow through the first LED string. The second current regulator is responsive to the rectified DC voltage having a magnitude within a second voltage range to cause a second current having a second current magnitude to flow through the first LED string and through the second LED string. The third current regulator is responsive to the rectified DC voltage having a magnitude within a third voltage range to cause a third current having a third current magnitude to flow through the first LED string, through the second LED string, and through the third LED string.

In certain embodiments in accordance with this aspect, the first voltage range has a first lower voltage magnitude and a first upper voltage magnitude. The second voltage range has a second lower voltage magnitude and a second upper voltage magnitude. The second lower voltage magnitude is greater than the first upper voltage magnitude. The third voltage range has a third lower voltage magnitude and a third upper voltage magnitude. The third lower voltage magnitude is greater than the second upper voltage magnitude. The second current magnitude is greater than the first current magnitude, and the third current magnitude is greater than the second current magnitude.

In certain embodiments in accordance with this aspect, the first current regulator includes a first constant current source, and the first current magnitude is responsive to a current from the first constant current source. The second current regulator includes a second constant current source, and the second current magnitude is responsive to a current from the second constant current source. The third current regulator includes a third constant current source, and the third current magnitude is responsive to a current from the third constant current source.

Another aspect of the invention disclosed herein is an LED driver circuit comprising a rectifier circuit that receives an AC voltage and that produces a rectified DC voltage. The rectified DC voltage is produced between a voltage rail and a reference rail. The rectified DC voltage varies sinusoidally between a minimum magnitude and a maximum magnitude during each half-cycle of the AC voltage. The LED driver circuit further includes at least a first LED string, a second LED string and a third LED string. Each LED string has a respective plurality of light-emitting diodes (LEDs). A first current regulator is responsive to the rectified DC voltage being in a first voltage range to enable a first current having a first current magnitude to flow only through the first LED string while the rectified DC voltage has a magnitude in the first voltage range. A second current regulator is responsive to the rectified DC voltage being in a second voltage range to enable a second current having a second current magnitude to flow only through the first LED string and the second LED string while the rectified DC voltage has a magnitude in the second voltage range. A third current regulator is responsive to the rectified DC voltage being in a third voltage range to enable a third current having a third current magnitude to flow through the first LED string, the second LED string and the third LED string while the rectified DC voltage has a magnitude in the first voltage range.

In certain embodiments in accordance with this aspect, the LED driver circuit further includes at least one additional LED string and at least one additional current regulator. The at least one additional LED string includes a respective plurality of LEDs. The at least one additional current regulator is responsive to the rectified DC voltage being in at least one additional voltage range to enable a current having a respective current magnitude to flow through the first LED string, the second LED string, the third LED string and the at least one additional LED string while the rectified DC voltage has a magnitude in the at least one additional voltage range.

DETAILED DESCRIPTION OF THE INVENTION

Figure 1:
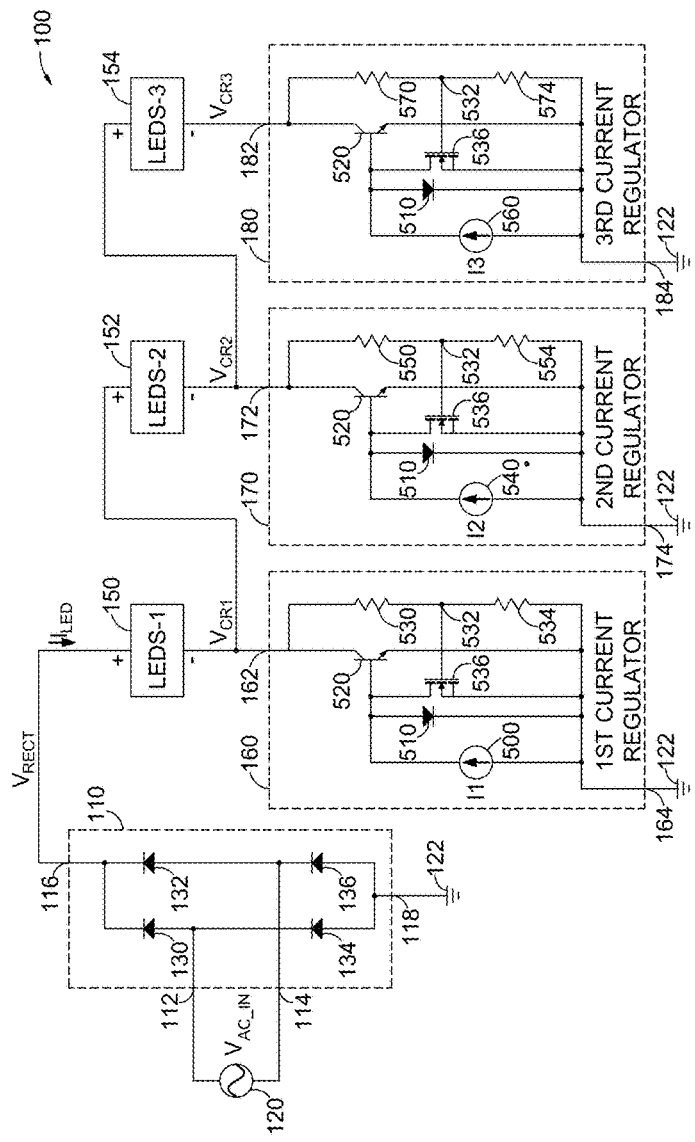
FIG. 1 illustrates a circuit diagram of an LED driver circuit having a rectifier, three LED strings, and three current regulating blocks.

FIG. 1 illustrates a circuit diagram of a light-emitting diode (LED) driver circuit 100. The LED driver circuit includes full-wave bridge rectifier 110 having a first input 112, a second input 114, a first output 116, and a second output 118.

The first and second inputs 112, 114 of the rectifier 110 are connected to an AC source 120 that provides an AC voltage ($V_{AC}$) across the two inputs. The AC source may be, for example, a conventional 120-volt (RMS) residential voltage source, having a peak-to-peak voltage of approximately ±170 volts or may be, for example, a conventional 277-volt (RMS) commercial voltage source, having a peak-to-peak voltage of approximately ±392 volts. The AC source may have a frequency of, for example, 50 Hz or 60 Hz. Other sources with different voltage magnitudes and with different frequencies may also be used with suitable modifications to the circuits described herein.

The rectifier 110 produces a positive DC voltage $V_{RECT}$ at the first output 116. The first output is also referred to herein as the voltage rail. The positive DC voltage on the voltage rail is referenced to the voltage at the second output 118. The second output is also referred to herein as the reference rail. In the illustrated embodiment, the second output (the reference rail) is connected to a common ground reference 122 in a conventional manner. Unless otherwise stated, all voltages discussed herein are referenced to the common ground reference.

In the illustrated embodiment, the rectifier 110 includes a first rectifier diode 130, a second rectifier diode 132, a third rectifier diode 134 and a fourth rectifier diode 136. The cathode of the first rectifier diode is connected to the first input 112, and the anode of the first rectifier diode is connected to the first output 116 (the voltage rail). The cathode of the second rectifier diode is connected to the second input 114, and the anode of the second rectifier diode is connected to the first output. The anode of the third rectifier diode is connected to the first input, and the cathode of the third rectifier diode is connected to the second output 118 (the reference rail). The anode of the fourth rectifier diode is connected to the second input, and the cathode of the fourth rectifier diode is connected to the second output. Accordingly, the four diodes of the rectifier are connected in a full-wave bridge configuration.

Figure 2:
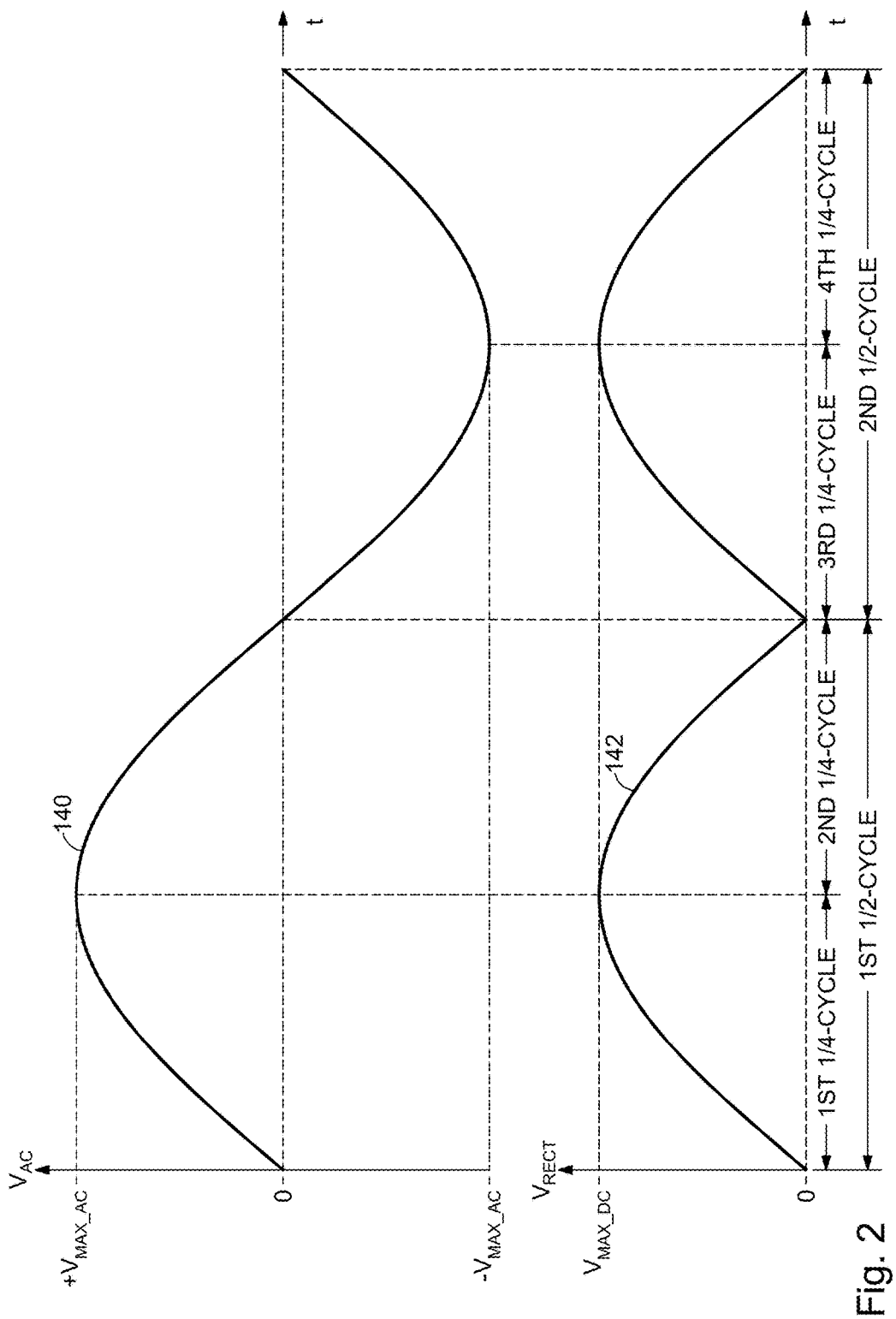
FIG. 2 illustrates one cycle (two half-cycles) of an AC voltage input waveform $V_{AC}$ applied to the input of the rectifier of FIG. 1 and a corresponding cycle of a rectified voltage waveform $V_{RECT}$ produced at the output of the rectifier of FIG. 1.

The rectifier 110 is responsive to the AC input voltage applied across the first input 112 and the second input 114 to produce a pulsating rectified DC output voltage $V_{RECT}$ across the first output 116 and the second output 118. For example, FIG. 2 illustrates an upper waveform 140 representing one cycle of the AC input voltage ($V_{AC}$), which varies between a maximum positive voltage ($+V_{MAX\_AC}$) and a maximum negative voltage ($-V_{MAX\_AC}$). A lower waveform 142 in FIG. 2 represents one cycle of the rectified DC output voltage $V_{RECT}$. During a first half-cycle, the rectified DC voltage increases from 0 volts to $+V_{MAX\_DC}$ during a first quarter-cycle and decreases from $+V_{MAX\_DC}$ to 0 volts during a second quarter-cycle. During a second half-cycle, the rectified DC voltage again increases from 0 volts to $+V_{MAX\_DC}$ during a third quarter-cycle, and decreases from $+V_{MAX\_DC}$ to 0 volts during a fourth quarter-cycle. The maximum magnitude of $+V_{MAX\_DC}$ is approximately two diode forward voltage drops less than the maximum magnitude of $+V_{MAX\_AC}$ (e.g., approximately 168 volts if the rectifier diodes 130, 132, 134, 136 have respective forward voltage drops of 1 volt. In the embodiments disclosed herein, the rectified DC output is unfiltered, and the waveform of each half-cycle of the rectified DC output voltage is similar to the waveform of the positive half-cycle of the AC input voltage.

Figure 4:
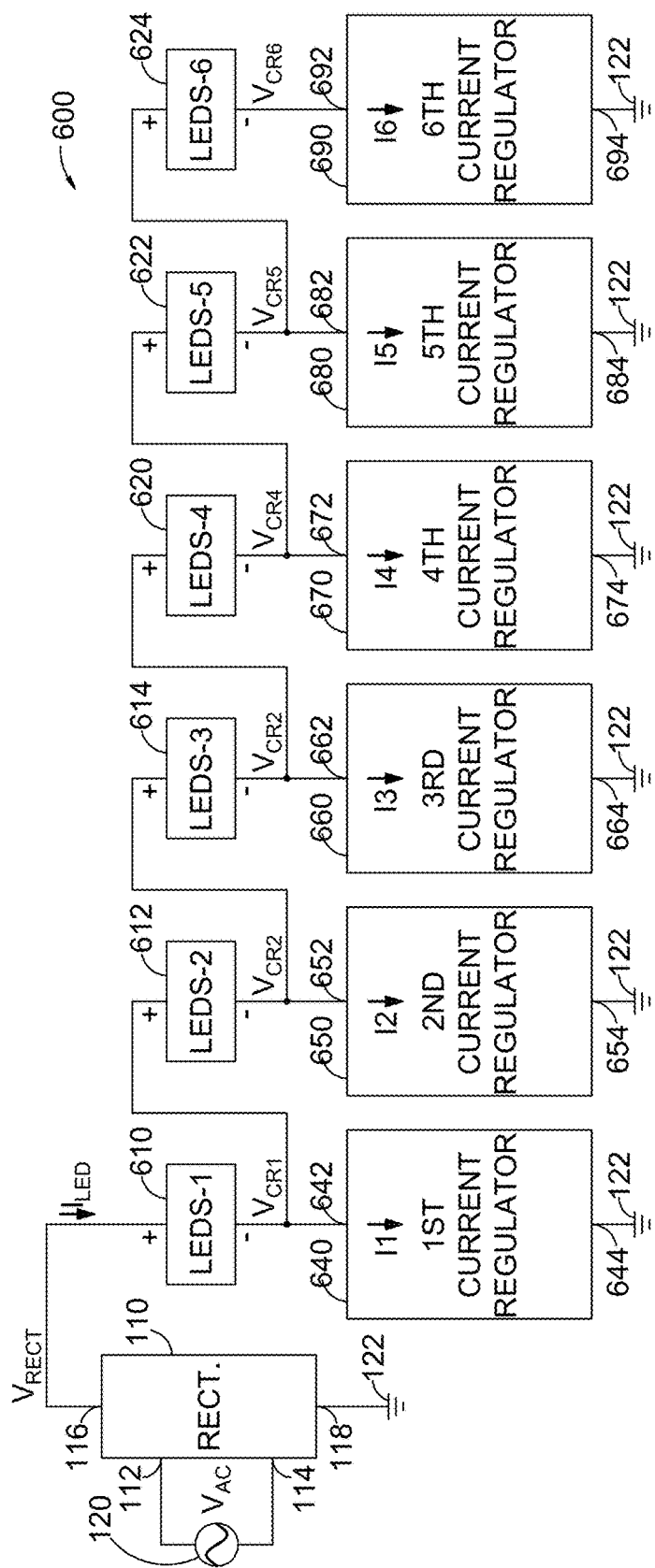
FIG. 4 illustrates a circuit diagram of an LED driver circuit similar to the LED driver circuit of FIG. 1 expanded to six LED strings and six current regulating blocks.

As further shown in FIG. 1, the positive DC voltage ($V_{RECT}$) on the first output 116 of the rectifier 110 is connected to a plurality of LED strings connected in series. A first LED string (LEDS-1) 150 has a respective first (positive (+)) terminal connected to the first output of the rectifier and has a respective second (negative (−)) terminal. A second LED string (LEDS-2) 152 has a respective first (positive (+)) terminal connected to the negative terminal of the first LED string and has a respective second (negative (−)) terminal. A third LED string (LEDS-3) 154 has a respective first (positive (+)) terminal connected to the negative (−) terminal of the second LED string and has a respective second (negative (−)) terminal. The following description refers to the respective first and second terminals of the LED strings as the positive and negative terminals. The three illustrated LED strings are used to explain the structure and operation of the LED driver circuit 100. Additional or fewer LED strings can be connected in series in alternative embodiments. For example, six LED strings are shown in FIG. 4.

As shown in FIG. 1, the respective negative terminals of the three LED strings are not connected directly to the ground reference 122. Rather, the negative terminal of the first LED string 150 is connected to a first terminal 162 of a first current regulator 160. A second terminal 164 of the first current regulator is connected to the ground reference. The negative terminal of the second LED string 152 is connected to a first terminal 172 of a second current regulator 170. A second terminal 174 of the second current regulator is connected to the ground reference. The negative terminal of the third LED string 154 is connected to a first terminal 182 of a third current regulator 180. A second terminal 184 of the third current regulator is connected to the ground reference.

Figure 3:
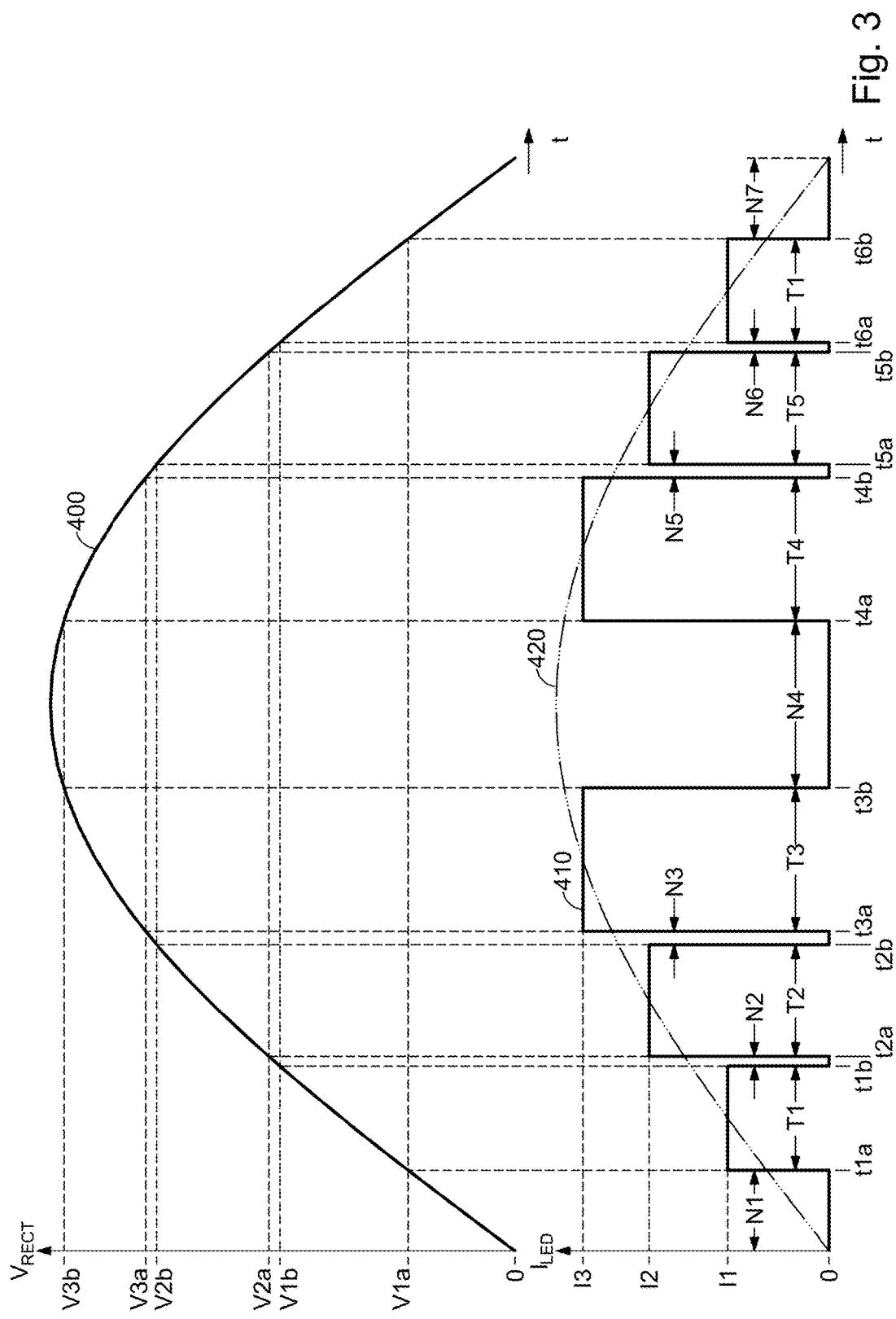
FIG. 3 illustrates one half-cycle of the rectified voltage waveform $V_{RECT}$ of FIG. 2 and illustrates one half-cycle of a current waveform $I_{LED}$ produced by the LED driver circuit of FIG. 1 in response to the half-cycle of the rectified voltage.

The operation of the LED driver circuit 100 is illustrated by an upper waveform 400 and a lower waveform 410 in FIG. 3. The upper waveform in FIG. 3 represents either the first half-cycle or the second half-cycle of the rectified DC voltage $V_{RECT}$ waveform 142 illustrated in FIG. 2. The operation of the LED driver circuit is the same during each half-cycle. The lower waveform in FIG. 3 represents the current flow ($I_{LED}$) from the first output 116 of the rectifier 110 to the second output 118 during the representative half-cycle and thus represents the current from the rectified DC voltage $V_{RECT}$ to the ground reference 122.

As illustrated by the current waveform 410 in FIG. 3, the current $I_{LED}$ flows during the first quarter-cycle (first half of the illustrated half-cycle) with three different magnitudes. The current flows during the second quarter-cycle (second half of the illustrated half-cycle) with three magnitudes corresponding to the three magnitudes during the first quarter-cycle. In the illustrated embodiment, the currents during the first and second quarter-cycles are symmetrical (or mirrored in time) with respect to midpoint of the half-cycle. The three current magnitudes during each quarter-cycle are caused by the structures and operations of the three current regulators 160, 170, 180.

At the beginning of each half-cycle of the rectified DC voltage $V_{RECT}$ (represented by the waveform 400 in FIG. 3), substantially zero current flows through the three LED strings 150, 152, 154 during a first non-conducting window N1. Thus, the $I_{LED}$ current waveform 410 in FIG. 3 has a substantially zero magnitude during the first non-conducting window N1. The first non-conducting window N1 lasts from the beginning of the half-cycle until the first current regulator 160 becomes operable during a first conducting window T1.

The first conducting window T1 extends from a first onset time t1a to a first end time t1b. During the first conducting window T1, the first current regulator couples the negative terminal of first LED string 150 to the ground reference 122 such that the current $I_{LED}$ flows only through the first LED string from the first output terminal 116 of the rectifier 110 to the ground reference. During the first conducting window T1, the current through the first LED string is controlled by the first current regulator to have a first current magnitude I1.

The first current regulator 160 turns off the current flow through the first LED string 150 at the first end time t1b to end the first conducting window T1 and to start a second non-conducting window N2. Substantially, no current flows through any of the LED strings during the second non-conducting window N2.

The second non-conducting window N2 ends when the second current regulator 170 becomes operable during a second conducting window T2. The second conducting window T2 extends from a second onset time t2a to a second end time t2b. During the second conducting window T2, the second current regulator couples the negative terminal of the second LED string 152 to the ground reference 122. During the second conducting window T2, the first current regulator 160 does not couple the negative terminal of the first LED string 150 to the ground reference. Thus, the operation of the second current regulator effectively connects the first LED string and the second LED string in series between the first output 116 of the rectifier 110 and the ground reference during the second conducting window T2. During the second conducting window T2, the common current $I_{LED}$ through the first LED string and through the second LED string is controlled by the second current regulator to have a second current magnitude I2.

The second current regulator 170 turns off the current flow through the first LED string 150 and the second LED string 152 at the second end time t2b to end the second conducting window T2 and to start a third non-conducting window N3. Substantially no current flows through any of the LED strings during the third non-conducting window N3.

The third non-conducting window N3 ends when the third current regulator 180 becomes operable during a third conducting window T3. The third conducting window T3 extends from a third onset time t3a to a third end time t3b. During the third conducting window T3, the third current regulator couples the negative terminal of the third LED string 154 to the ground reference 122. During the third conducting window T3, the first current regulator 160 does not couple the negative terminal of the first LED string 150 to the ground reference, and the second current regulator 170 does not couple the negative terminal of the second LED string 152 to the ground reference. Thus, the operation of the third current regulator effectively connects the first LED string, the second LED string and the third LED string in series between the first output 116 of the rectifier 110 and the ground reference. During the third conducting window T3, the common current $I_{LED}$ through the first LED string, the second LED string and the third LED string is controlled by the third current regulator to have a third current magnitude I3.

The third current regulator 180 turns off the current flow through the first LED string 150, the second LED string 152 and the third LED string 154 at the third end time t3b to end the third conducting window and to start a fourth non-conducting window N4. As illustrated in FIG. 3, the fourth non-conducting window N4 extends across the midpoint of the half-cycle through the end of the first quarter-cycle and into the beginning of the second quarter-cycle. Substantially no current flows through any of the LED strings during the fourth non-conducting window N4.

The fourth non-conducting window N4 ends when the third current regulator 180 is operable during a fourth conducting window T4 to couple the negative terminal of the third LED string 154 to the ground reference. The first current regulator 160 and the second current regulator 170 remain inactive during the fourth conducting window T4. Thus, the first LED string 150, the second LED string 152 and the third LED string are connected in series between the first output 116 of the rectifier 110 and the ground reference 122 during the fourth conducting window T4. The fourth conducting window T4 extends from a fourth onset time t4a to a fourth end time t4b. During the fourth conducting window T4, the common current $I_{LED}$ through the three LED strings is controlled by the third current regulator to have the third current magnitude I3.

The fourth end time t4b ends the fourth conducting window and starts a fifth non-conducting window N5. Substantially no current flows through any of the three LED strings during the fifth non-conducting window N5.

The fifth non-conducting window N5 ends when the second current regulator 170 is operable during a fifth conducting window T5 to couple the negative terminal of the second LED string 152 to the ground reference 122. The first current regulator 160 remains inactive during the fifth conducting window T5. Thus, the first LED string 150 and the second LED string are connected in series between the first output 116 of the rectifier 110 and the ground reference. No current flows through the third LED string 154 during the fifth conducting window T5 because the third LED string and the third current regulator 180 are bypassed when the second current regulator is operable during the fifth conducting window T5. The fifth conducting window T5 extends from a fifth onset time t5a to a fifth end time t5b. During the fifth conducting window T5, the common current $I_{LED}$ through the first LED string and the second LED string is controlled by the second current regulator to have the second current magnitude I2.

The fifth end time t5b ends the fifth conducting window T5 and starts a sixth non-conducting window N6. Substantially no current flows through any of the three LED strings during the sixth non-conducting window N6.

The sixth non-conducting window N6 ends when the first current regulator 160 is operable during a sixth conducting window T6 to couple the negative terminal of the first LED string 150 to the ground reference 122. No current flows through the second LED string 152 and the third LED string 154 during the sixth conducting window T6 because the second LED string and the second current regulator 170 and the third LED string and the third current regulator 180 are bypassed when the first current regulator is operable during the sixth conducting window T6. Only the first LED string is connected between the first output 116 of the rectifier 110 and the ground reference such that the current $I_{LED}$ flows only through the first LED string during the sixth conducting window T6. The sixth conducting window T6 extends from a sixth onset time t6a to a sixth end time t6b. During the sixth conducting window T6, the current $I_{LED}$ through the first LED string is controlled by the first current regulator to have the first current magnitude I1.

The sixth end time t6b ends the sixth conducting window T6 and starts a seventh non-conducting window N7. Substantially no current flows through any of the three LED strings during the seventh non-conducting window. The seventh non-conducting window N7 extends to the end of the half-cycle. The end of the seventh non-conducting window at the end of the half-cycle corresponds to the beginning of the first non-conducting window N1 of the next half-cycle.

The foregoing sequence is repeated again during the third and fourth quarter-cycles (i.e., during the second half-cycle) of the rectified DC waveform. The sequence continues to repeat during each subsequent cycle of the rectified DC waveform.

In the illustrated embodiment, the onset times and the end times of the six conducting windows T1, T2, T3, T4, T5, T6 are controlled by selected magnitudes of the rectified DC voltage $V_{RECT}$ in accordance with the following description.

As shown in FIG. 3, the first onset time t1a of the first conducting window T1 occurs when the rectified DC voltage $V_{RECT}$ (waveform 400) increases to a first lower threshold voltage V1a. The first lower threshold voltage is determined, in part, by the number of LEDs connected in series within the first LED string 150. In particular, the first threshold voltage is approximately the same as the sum of the forward voltage drops through the series-connected LEDs within the first LED string. For example, if the first LED string includes 13 LEDs connected in series and if each LED has a forward voltage of approximately 3 volts, the first lower threshold voltage is approximately 39 volts. The first LED string may have a different number of LEDs, and the forward voltage drops of the LEDs in the string may differ from the example.

The first current regulator 160 provides a conductive path from the negative terminal of the first LED string 150 to the ground reference 122 and is assumed to have an initial voltage drop of approximately zero volts such that a first common voltage $V_{CR1}$ on the first terminal 162 of the first current regulator 160 and the negative terminal of the first LED string is initially at approximately zero volts. In the illustrated example of thirteen 3-volt LEDs in the first LED string, when the magnitude of the rectified DC voltage $V_{RECT}$ reaches approximately 39 volts, the LEDs in the first LED string become forward-biased between the first output 116 of the rectifier 110 and the ground reference. The forward-biased LEDs begin to conduct the current $I_{LED}$ at the first current magnitude I1 under control of the first current regulator. The LEDs are illuminated with an intensity determined by the first current magnitude I1. For example, in one embodiment, the first current magnitude I1 may be selected to correspond to approximately 37 percent of the maximum allowable magnitude of the forward current through each LED. If, for example, the maximum allowable forward current is 360 milliamps, the first current magnitude I1 may be selected to be approximately 133 milliamps. In other embodiments, the first current magnitude I1 may be selected to have a different value.

During the first conducting window T1, as the rectified DC voltage $V_{RECT}$ continues to increase, the first common voltage $V_{CR1}$ on the first terminal 162 of the first current regulator 160 also increases to remain approximately 39 volts (e.g., 13 forward voltage drops) lower than the increasing rectified DC voltage. By sensing the magnitude of the first common voltage $V_{CR1}$, the first current regulator is able to effectively sense the magnitude of the rectified DC voltage.

The first end time t1b of the first conducting window T1 occurs when the rising DC voltage $V_{RECT}$ increases to a first upper threshold voltage V1b which causes the first common voltage $V_{CR1}$ to increase to a voltage of V1b—39 volts. When the magnitude of the rectified DC voltage reaches the first upper threshold voltage V1b, the first current regulator 160 disables the current path from the negative terminal of the first LED string 150 to the ground reference 122. The first upper threshold voltage V1b is selected to be lower than a total of the first forward voltage drop across the first LED string and a second forward voltage drop across the second LED string 152 in series so that the first current regulator disables the current flow before the second LED string become forward biased. For the purposes of the following discussion, the forward voltage drop of the second LED string is assumed to be approximately 51 volts representing the voltage drop across 17 LEDs connected in series. Thus, the total forward voltage drop across the first and second LED strings in series is approximately 90 volts (e.g., corresponding to 30 LEDs connected in series). Accordingly, the first upper threshold voltage V1b is selected to be less than 90 volts. For example, in the illustrated embodiment, the first upper threshold voltage V1b may be selected to be approximately 86 volts.

After the current path through the first current regulator 160 to the ground reference 122 is disabled at the first end time t1b, the rectified DC voltage $V_{RECT}$ continues to increase. The first common voltage $V_{CR1}$ on the negative terminal of the first LED string 150 also continues to increase to maintain a magnitude that is 39 volts less than the rectified DC voltage. During the second non-conducting window N2 from the first end time t1b until the second onset time t2a of the second conducting window T2, substantially no current flows through the first LED string because the second LED string 152 is not yet forward biased and does not conduct current. For example, at the first end time t1b, the first common voltage $V_{CR1}$ is 47 volts (e.g., 86 volts–39 volts), which is insufficient to forward bias the LEDs in the second LED string to activate a current path through the second current regulator 170.

At the second onset time t2a, the rectified DC voltage $V_{RECT}$ has increased to a magnitude of approximately 90 volts, which is identified as the second lower threshold voltage V2a of the rectified DC voltage. This magnitude of the rectified DC voltage causes the first common voltage $V_{CR1}$ to have a magnitude of approximately 51 volts (e.g., 90 volts–39 volts) at the negative terminal of the first LED string 150. In the illustrated example, a magnitude of 51 volts is sufficient to forward bias the 17 LEDs in the second LED string 152. Accordingly, the second lower threshold voltage V2a is sufficient to cause the LEDs in both the first LED string and the second LED string to be forward biased and to illuminate the LEDs in both strings.

At the second onset time t2a, the second current regulator 170 initially has a substantially zero voltage drop between the first terminal 172 and the ground reference 122. Thus, the second current regulator provides a current path from the first output terminal 116 of the rectifier 110 to the ground reference through the first LED string 150 in series with the second LED string 152. The common current $I_{LED}$ flowing through the first LED string and through the second LED string to the ground reference is controlled by the second current regulator to have the second current magnitude I2. In the illustrated embodiment, the second current magnitude I2 is selected to be approximately 66 percent of the maximum current flow (e.g., approximately 240 milliamps). In other embodiments, the second current magnitude I2 may be selected to have a different value. The first LED string and the second LED string are both illuminated during the second conducting window T2 with an intensity determined by the second current magnitude I2.

During the second conducting window T2, the combined forward voltage drops of the first LED string 150 and the second LED string 152 cause the magnitude of a second common voltage $V_{CR2}$ on the negative terminal of the second LED string and the first terminal 172 of the second current regulator to be approximately 90 volts lower than the magnitude of the rectified DC voltage $V_{RECT}$. The second common voltage $V_{CR2}$ is approximately zero volts at the second onset time t2a. As the rectified DC voltage increases during the second conducting window T2, the second common voltage $V_{CR2}$ increases to remain approximately 51 volts lower than the first common voltage $V_{CR1}$ on the negative terminal of the first LED string (e.g., approximately 90 volts lower than the rectified DC voltage $V_{RECT}$). The second current regulator senses the second common voltage $V_{CR2}$ and thus effectively senses the rectified DC voltage.

The second end time t2b of the second conducting window T2 occurs when the rising DC voltage ($V_{RECT}$) increases to a second upper threshold voltage V2b. The second current regulator 170 senses when the rectified DC voltage reaches the second upper threshold voltage V2b and disables the current path from the first terminal 172 of the second current regulator to the ground reference 122. The second upper threshold voltage V2b is selected to be lower than a total of the first forward voltage drop across the first LED string 150, the second forward voltage drop across the second LED string 152 and a third forward voltage drop across the third LED string 154. For the purposes of the following discussion, the forward voltage drop of the third LED string is assumed to be approximately 45 volts representing the voltage drop across 15 LEDs connected in series. Thus, the total forward voltage drop is approximately 135 volts (e.g., corresponding to 45 LEDs connected in series). Accordingly, the second upper threshold voltage V2b is selected to be less than 135 volts. For example, the second upper threshold voltage V2b may be approximately 131 volts, which corresponds to the second common voltage $V_{CR2}$ being approximately 41 volts (e.g., 131 volts–90 volts).

After the current path through the second current regulator 160 is disabled, the second common voltage $V_{CR2}$ on the negative terminal of the second LED string 152 continues to increase during the third non-conducting window N3 to remain approximately 90 volts less than the increasing rectified DC voltage. For example, at the second end time t2b at the beginning of the third non-conducting window N3, the voltage on the negative terminal of the second LED string is 41 volts, which is insufficient to forward bias the LEDs in the third LED string 154. Thus, no current flows through any of the three LED strings during the third non-conducting window N3.

At the third onset time t3a, the rectified DC voltage has increased to a magnitude of approximately 135 volts, which corresponds to a third lower threshold voltage V3a of the rectified DC voltage. This magnitude of the rectified DC voltage causes the second common voltage $V_{CR2}$ to have a magnitude of approximately 45 volts (e.g., 135 volts–90 volts) at the negative terminal of the second LED string 152. In the illustrated example, a magnitude of 45 volts is sufficient to forward bias the 15 LEDs in the third LED string 154. Accordingly, the third lower threshold voltage V3a is sufficient to cause the LEDs in the first LED string 150, the second LED string and the third LED string to be forward biased and to illuminate the LEDs in the three strings.

At the third onset time t3a, the third current regulator 180 initially has a substantially zero voltage drop between the first terminal 182 and the ground reference 122. Thus, the third current regulator provides a current path from the first output terminal 116 to the ground reference through the first LED string 150, the second LED string 152 and the third LED string in series. The common current $I_{LED}$ flowing through the three LED strings to the ground reference is controlled by the third current regulator to have the third current magnitude I3. In the illustrated embodiment, the third current magnitude I3 is selected to be approximately 90 percent of the maximum current flow (e.g., approximately 324 milliamps). In other embodiments, the third current magnitude I3 may be selected to have a different value. The first LED string, the second LED string and the third LED string are all illuminated during the third conducting window T3 with an intensity determined by the third current magnitude I3.

During the third conducting window T3, the combined forward voltage drops of the first LED string 150, the second LED string 152 and the third LED string 154 cause the magnitude of a third common voltage $V_{CR3}$ on the negative terminal of the third LED string 154 and the first terminal 182 of the third current regulator 180 to be approximately 135 volts lower than the magnitude of the rectified DC voltage $V_{RECT}$. The third common voltage $V_{CR3}$ is approximately zero volts at the third onset time t3a. As the rectified DC voltage increases during the third conducting window T3, the third common voltage $V_{CR3}$ also increases to remain approximately 45 volts lower than the second common voltage $V_{CR2}$ on the negative terminal of the second LED string (e.g., approximately 135 volts lower than the rectified DC voltage). The third current regulator senses the third common voltage $V_{CR3}$ and thus effectively senses the rectified DC voltage.

The third end time t3b of the third conducting window T3 occurs when the rectified DC voltage $V_{RECT}$ increases to a third upper threshold voltage V3b. The third current regulator 180 senses when the rectified DC voltage reaches the third upper threshold voltage V3b and disables the current path from the first terminal of the third current regulator to the ground reference 122. The third upper threshold voltage V3b is selected to be lower than a peak voltage of the rectified DC voltage. For example, for an LED lighting driver intended for conventional 120-volt residential installation, the peak voltage of the rectified DC voltage is approximately 170 volts (ignoring voltage drops through the rectifier diodes and other losses in the circuitry). Accordingly, the third upper threshold voltage V3b is selected to be less than 170 volts. For example, the third upper threshold voltage V3b may be approximately 166 volts. The third upper threshold voltage V3b causes the third common voltage $V_{CR3}$ to have a magnitude of approximately 31 volts (e.g., 166 volts–135 volts) at the third end time t3b.

When the third upper threshold voltage V3b is reached at the third end time t3b, the third current regulator 180 disables the current path to the ground reference 122. The third conducting window T3 ends, and the fourth non-conducting window N4 starts. Substantially no current flows through any of the LED strings during the fourth non-conducting window N4. As illustrated in FIG. 3, the fourth non-conducting window N4 extends to the end of the first quarter-cycle and partially into the second quarter-cycle.

By selecting the third upper threshold voltage V3b to be less than the expected peak voltage, the third current regulator 180 also operates to prevent the three LED strings 150, 152, 154 from operating when the input voltage exceeds the expected peak voltage. For example, if a voltage surge occurs such that the peak voltage increases above 170 volts, the current path through the three LED strings will have already been disconnected when the voltage reached 166 volts. Thus, the LEDs in the LED strings will not experience an overvoltage condition caused by the surge.

The three current regulators 160, 170, 180 will also operate to prevent a voltage spike during a half-cycle from causing the voltage across the three LED strings to exceed a maximum safe voltage. For example, if a voltage spike exceeding the maximum peak voltage occurs during the first conducting window T1, the first current regulator will sense the voltage being greater than the first upper threshold V1$b$ and will disable the current flow through the first current regulator. Although the voltage spike may also be sufficient to forward bias the first LED string 150 and the second LED string 152 in series, the second current regulator will sense the voltage being greater than the second upper threshold V2$b$ and will disable the current flow through the second current regulator. Although the voltage spike may also be sufficient to forward bias the first LED string, the second LED string and the third LED string 154 in series, the third current regulator will sense the voltage being greater than the third upper threshold V3$b$ and will disable current flow through the third current regulator. Accordingly, the three current regulators operate together to prevent damage to the LEDs because of voltage spikes.

As further shown in FIG. 3, the operations of the three current regulators are symmetrical with respect to the midpoint of each half-cycle. The fourth non-conducting window N4 extends until the fourth onset time t4$a$ at the beginning of the fourth conducting window T4. The fourth onset time t4$a$ occurs after the rectified DC voltage $V_{RECT}$ peaks at the midpoint of the half-cycle and decreases to a fourth upper threshold voltage V4$b$. In some embodiments, the fourth upper threshold voltage has the same or substantially the same magnitude as the third upper threshold voltage V3$b$; however, asymmetric effects in the operation of the circuit may cause the two voltages to differ. When the rectified DC voltage decreases to the fourth upper threshold voltage V4$b$, the third current regulator 180 senses that the third common voltage $V_{CR3}$ is no longer above a magnitude corresponding to the fourth upper threshold voltage V4$b$. The third current regulator enables the current path from the negative terminal of the third LED string 154 to the ground reference 122. During the fourth conducting window T4, the first LED string 150, the second LED string 152 and the third LED string are again connected in series to conduct a common current $I_{LED}$ having the third current magnitude I3.

The third current regulator 180 continues to provide the common current $I_{LED}$ at the third magnitude I3 until the rectified DC voltage decreases to a fourth lower threshold voltage V4$a$ at the fourth end time t4$b$. In some embodiments, the fourth lower threshold voltage V4$a$ has the same or substantially the same magnitude as the third lower threshold voltage V3$a$; however, asymmetric effects in the operation of the circuit may cause the two voltages to differ. When the rectified DC voltage decreases to the fourth lower threshold voltage V4$a$, the voltage is insufficient to forward bias the three LED strings 150, 152, 154 in series. Thus, substantially no current flows through any of the LED strings during the fifth non-conducting window N5 that starts at the fourth end time t4$b$.

The rectified DC voltage $V_{RECT}$ continues to decrease below the fourth lower threshold voltage V4$a$ during the fifth non-conducting window N5 until the voltage reaches a fifth upper threshold voltage V5$b$ at the fifth onset time t5$a$. In some embodiments, the fifth upper threshold voltage has the same or substantially the same magnitude as the second upper threshold voltage V2$b$; however, asymmetric effects in the operation of the circuit may cause the two voltages to differ. When the rectified DC voltage decreases to the fifth upper threshold voltage V5$b$, the second current regulator 170 senses that the second common voltage $V_{CR2}$ is no longer above a magnitude corresponding to the fifth upper threshold voltage V5$b$ and enables the current path from the negative terminal of the second LED string 152 to the ground reference 122. During the fifth conducting window T5, the first LED string 150 and the second LED string are again connected in series to conduct a common current having the second magnitude I2. During the fifth conducting window T5, the second common voltage $V_{CR2}$ at the negative terminal of the second LED string remains below the forward voltage of the third LED string 154. Thus, the third LED string remains off and does not illuminate during the fifth conducting window T5.

The second current regulator 170 continues to provide a constant current at the second magnitude I2 until the rectified DC voltage decreases to a fifth lower threshold voltage V5$a$ at the fifth end time t5$b$. In some embodiments, the fifth lower threshold voltage V5$a$ has the same or substantially the same magnitude as the second lower threshold voltage V2$a$; however, asymmetric effects in the operation of the circuit may cause the two voltages to differ. When the rectified DC voltage decreases to the fifth lower threshold voltage V5$a$, the voltage is insufficient to forward bias the two LED strings 150, 152 in series. Thus, substantially no current flows through any of the LED strings during the sixth non-conducting window N6 that starts at the fifth end time t5$b$.

The rectified DC voltage continues to decrease below the fifth lower threshold voltage V5$a$ during the sixth non-conducting window N6 until the voltage reaches a sixth upper threshold voltage V6$b$ at the sixth onset time t6$a$. In some embodiments, the sixth upper threshold voltage has the same or substantially the same magnitude as the first upper threshold voltage V1$b$; however, asymmetric effects in the operation of the circuit may cause the two voltages to differ. When the rectified DC voltage decreases to the sixth upper threshold voltage V6$b$, the first current regulator 160 senses that the first common voltage $V_{CR1}$ is no longer above a magnitude corresponding to the sixth upper threshold voltage V6$b$. The first current regulator enables the current path from the negative terminal of the first LED string 150 to the ground reference 122. The first LED string conducts the current $I_{LED}$ having the first current magnitude I1 during the sixth conducting window T6. The first common voltage $V_{CR1}$ at the negative terminal of the first LED string is below the forward voltage of the second LED string 154. Thus, the second LED string remains off and does not illuminate during the sixth conducting window T6. The third LED string 154 is also off during the sixth conducting window T6.

The first current regulator 160 continues to provide a constant current at the first magnitude I1 through the first LED string 150 until the rectified DC voltage $V_{RECT}$ decreases to a sixth lower threshold voltage V6$a$ at the sixth end time t6$b$. In some embodiments, the sixth lower threshold voltage V6$a$ has the same or substantially the same magnitude as the first lower threshold voltage V1$a$; however, asymmetric effects in the operation of the circuit may cause the two voltages to differ. When the rectified DC voltage decreases to the sixth lower threshold voltage V6$a$, the voltage is insufficient to forward bias the first LED string. Thus, substantially no current flows through any of the LED strings during the seventh non-conducting window N7 that starts at the sixth end time t6$b$.

The three LED strings 150, 152, 154 remain off during the seventh non-conducting window N7 to the end of the half-cycle and remain off during the first non-conducting window N1 at the beginning of the next half-cycle until the onset time t1a of the first conducting window T1 of the next half-cycle of the rectified DC voltage $V_{RECT}$. The foregoing operations are repeated during the next half-cycle.

As illustrated in FIG. 3, the current waveform 410 has six current pulses during the conducting windows T1, T2, T3, T4, T5 and T6. The pulse magnitudes increase during the conducting windows T1, T2 and T3 in the first quarter-cycle, and the pulse magnitudes decrease during the conducting windows T4, T5 and T6 in the second quarter-cycle. As illustrated by a phantom line 420 passing through each current pulse in FIG. 3, the six pulses form a generally sinusoidal envelope. The sinusoidal current envelope is in phase with the sinusoidal rectified DC voltage $V_{RECT}$. Accordingly, the effect of the current pulses generated by the three current regulators 160, 170, 180 is to produce an overall current $I_{LED}$ having an effective power factor close to an ideal high power factor of 1. As represented by the sinusoidal envelope, the LED current $I_{LED}$ neither leads nor lags the rectified DC voltage. Thus, the corresponding AC input current from the AC source 120 neither leads nor lags the AC input voltage.

As shown in FIG. 1 for the illustrated embodiment, the three current regulators 160, 170, 180 have similar components that are interconnected to form similar circuit structures; however, the values of selected components within the three regulators differ to cause the three regulators to control the three LED strings 150, 152, 154 with the different current magnitudes I1, I2 and I3. The selected components also cause the conducting windows enabled by the current regulators to have onset times and offset times that occur at different magnitudes of the rectified DC voltage $V_{RECT}$.

The first current regulator 160 includes a first constant current source 500. The first current source has a conventional structure and has a conventional operation. The first current source is connected to a power source (not shown), which may be, for example, a simple low voltage supply connected to the AC input. The power required for the first current source is insignificant compared to the power required for the LEDs in the three LED strings 150, 152, 154 and thus does not substantially affect the power consumption of the overall circuit 100 or substantially affect the power factor of the overall circuit.

The first current source 500 in the first current regulator 160 provides a respective constant current having the magnitude I1. The current from the current source is provided to the anode of an "input diode" 510. The cathode of the input diode is connected to the second terminal 164 of the first current regulator and is thereby connected to the ground reference 122. The input diode forms the input to a current mirror formed by the input diode and an output transistor 520. In the illustrated embodiment, the output transistor may be a bipolar NPN transistor.

The output transistor 520 has a base connected to the anode of the input diode and has an emitter connected to the second terminal 164 of the first current regulator 160 and thereby connected to the ground reference 122. The output transistor has a collector connected to the respective first terminal 162 of the first current regulator.

Although represented as a simple diode, the input diode may be a second bipolar NPN transistor having substantially the same transfer characteristics between the base-emitter voltage $V_{BE}$ and the collector current $I_C$. The base and collector of the input diode are connected together so that the input diode effectively operates as a conventional diode. When the base and collector of a transistor are connected in this manner, the base-emitter voltage of the transistor is responsive to the collector current. Connecting the base and collector of the input diode to the base of the output transistor 520 causes the base-emitter voltages of the two devices to always have the same value. Selecting the two devices to have the same transfer characteristics between the base-emitter voltage and the collector current causes the collector current of the output transistor to substantially conform to the constant current I1 through the input diode. Thus, as long as the collector of the output transistor is coupled to a voltage source capable of providing an adequate current, the output transistor sinks a constant collector current with the third current magnitude I1 via the first terminal 162 of the third current regulator 160 regardless of the magnitude of the first common voltage $V_{CR1}$ applied to the first terminal. When conducting, the output transistor operates in an unsaturated, active mode such that the collector-emitter voltage may vary over a wide range.

When the LEDs in the first LED string 150 are not forward biased during the first non-conducting window N1 at the beginning of each half-cycle and during the seventh non-conducting window N7 at the end of each half-cycle, no path is provided for the current flow, and the output transistor is unable to mirror the current from the constant current source during the respective non-conducting windows.

It will be appreciated that the simple one-to-one current mirror illustrated in FIG. 1 may be replaced with an embodiment of a current mirror in which two or more output transistors are connected in parallel. The currents through the collectors of the parallel output transistors are combined to cause the combined current at the first terminal 162 of the first current regulator to be a multiple of the constant current from the constant current source 500. For example, if two output transistors are connected in parallel in a one-to-two current mirror configuration to provide current at the first current magnitude I1, the constant current source only provides a constant current having a magnitude of one-half of I1. Accordingly, when such a one-to-two current mirror, the constant current source may provide a current that is only proportional to the first current magnitude I1 rather than equal to the first current magnitude I1.

The first current regulator 160 further includes a voltage sensing circuit comprising a first sensing resistor 530 having a first terminal connected to the first terminal 162 of the first current regulator and having a second terminal connected to an internal sensing node 532. The voltage sensing circuit further includes a second sensing resistor 534 having a first terminal connected to the internal sensing node and having a second terminal connected to the second terminal 164 of the first current regulator and thereby connected to the ground reference 122. The first and second sensing resistors operate as a voltage divider such that a voltage on the internal sensing node is a predetermined percentage of the first common voltage $V_{CR1}$ on the first terminal of the first current regulator.

The voltage sensing circuit further includes a switching transistor 536 having a control terminal connected to the internal sensing node 532. The switching transistor has a first input/output terminal connected to the second terminal 164 of the first current regulator 160 and thereby connected to the ground reference 122. The switching transistor has a second input/output terminal connected to the base of the output transistor 520. In the illustrated embodiment, the switching transistor may be a metal oxide semiconductor field effect transistor (MOSFET) wherein the control terminal is the gate of the MOSFET, the first input/output terminal is the source of the MOSFET, and the second input/output terminal is the drain of the MOSFET.

The switching transistor 536 does not conduct when the voltage applied to the gate from the internal sensing node 532 is below a certain switching threshold voltage. When the voltage on the internal sensing node reaches a predetermined voltage, the switching transistor conducts and pulls the drain substantially to the ground reference 122. This causes the base-emitter voltage of the output transistor 520 to also be pulled to ground. The grounded base of the output transistor causes the output transistor to turn off and stop conducting. Thus, the current flowing through the first current regulator 160 from the first terminal 162 to the second terminal 162 is reduced to substantially zero. For example, the resistance value of at least one of the first sensing resistor 530 and the second sensing resistor 534 is selected to be sufficiently high that the current flowing through the two sensing resistors when the output transistor is not conducting is insignificant (e.g., insufficient to allow the LEDs in the first LED string 150 to illuminate).

In the illustrated embodiment, the resistance values of the first sensing resistor 530 and the second sensing resistor 534 are selected such that when the first common voltage $V_{CR1}$ at the first terminal 162 of the first current regulator 160 increases to 47 volts, the voltage on the internal sensing node 532 is sufficient to activate the switching transistor 536, which shuts off the output transistor 520 so that collector current no longer flows through the output transistor. Thus, when the rectified DC voltage $V_{RECT}$ reaches the first upper threshold voltage V1a at the first end time t1b during the first quarter-cycle of each half-cycle, the first current regulator operates to disable the current $I_{LED}$ through the first LED string 150 as described above.

During the second non-conducting window N2, the second conducting window T2, the third non-conducting window N3, the third conducting window T3, the fourth non-conducting window N4, the fourth conducting window T4 and the fifth non-conducting window N5, the voltage on the sensing node 532 of the first current regulator 160 remains above the switching threshold voltage of the switching transistor 536 such that switching transistor remains on and the output transistor 520 remains off.

When the rectified DC voltage $V_{RECT}$ decreases below the sixth upper threshold V6b at the sixth onset time t6a during the second quarter-cycle of each half-cycle, the voltage on the sensing node 532 and on the gate of the switching transistor 536 is no longer sufficient to activate the switching transistor. The switching transistor turns off and no longer clamps the base of the output transistor 520 to the ground reference. Accordingly, the output transistor again conducts in the active mode during the sixth conducting window to maintain the current $I_{LED}$ flowing through the first LED string 150 at the first current magnitude I1 during the sixth conducting window T6.

At the sixth end time t6b, the rectified DC voltage $V_{RECT}$ is no longer sufficient to forward bias the LEDs in the first LED string 150. Thus, although the output transistor 520 in the first current regulator 160 continues to be biased in the active mode, no current flows through the first LED string to enable the LEDs in the first LED string to illuminate.

The second current regulator 170 has substantially the same structure as the first current regulator 160. The input diode 510, the output transistor 520, the internal sensing node 532, and the switching transistor (MOSFET) 536 in the second current regulator corresponding to the elements in the first current regulator are identified with the same reference identifiers. The first constant current source 500 in the first current regulator is replaced with a second constant current source 540 in the second current regulator. The first sensing resistor 530 and the second sensing resistor 534 in the first current regulator are replaced with a respective first sensing resistor 550 and a respective second sensing resistor 554 in the second current regulator.

The second constant current source 540 also has a conventional structure and a conventional operation. The second constant current source differs from the first constant current source 500 by providing a constant current having the second current magnitude I2 (or a magnitude proportional to the second current magnitude I2 if a current mirror other than the illustrated one-to-one current mirror is used). The values of the first sensing resistor 550 and the second sensing resistor 554 in the second current regulator are selected to cause the switching transistor 536 to activate and turn off the output transistor 520 when the second common voltage $V_{CR2}$ on the first terminal 172 of the second current regulator increases to approximately 41 volts. In the illustrated example, the transition occurs when the rectified DC voltage $V_{RECT}$ increases to approximately 131 volts at the second end time t2b during the first quarter-cycle in each half cycle. The second current regulator does not conduct current during the third non-conducting window N3, the third conducting window T3, the fourth non-conducting window N4, the fourth conducting window T4 or the fifth non-conducting window N5.

When the rectified DC voltage decreases to approximately 131 volts and the second common voltage $V_{CR2}$ decreases to approximately 41 volts at the fifth onset time t5a during the second quarter-cycle of each half-cycle, the voltage on the sensing node 532 in the second current regulator 170 is sufficient to deactivate the switching transistor 536, which unclamps the base of the output transistor 520 to allow the output transistor to provide the constant collector current having the second magnitude I2 during the fifth conducting window T5.

At the fifth end time t5b, the rectified DC voltage $V_{RECT}$ is no longer sufficient to forward bias the LEDs in the first LED string 150 and the second LED string 154 connected in series. Thus, although the output transistor 520 in the second current regulator 170 continues to be biased in the active mode, no current flows through the second LED string to enable the LEDs in the second LED string to illuminate during the remainder of the second quarter-cycle.

The third current regulator 180 also has substantially the same structure as the first current regulator 160. The input diode 510, the output transistor 520, the internal sensing node 532, and the switching transistor (MOSFET) 536 in the third current regulator correspond to the elements in the first current regulator and are identified with the same reference identifiers. The first constant current source 500 in the first current regulator is replaced with a third constant current source 560 in the third current regulator. The first sensing resistor 530 and the second sensing resistor 534 in the first current regulator are replaced with a respective first sensing resistor 570 and a respective second sensing resistor 574 in the second current regulator.

The third constant current source 560 also has a conventional structure and a conventional operation. The third constant current source differs from the first constant current source 500 by providing a constant current having the third current magnitude I3 (or a magnitude proportional to the third current magnitude I3 if a current mirror other than the illustrated one-to-one current mirror is used). The values of the first sensing resistor 550 and the second sensing resistor 554 in the third current regulator are selected to cause the switching transistor 536 to activate and turn off the output transistor 520 when the third common voltage $V_{CR3}$ on the first terminal 182 of the third current regulator increases to approximately 31 volts. In the illustrated example, the transition occurs when the rectified DC voltage $V_{RECT}$ increases to approximately 166 volts at the third end time t3*b* during the first quarter-cycle in each half cycle. The third current regulator does not conduct current during the fourth non-conducting window N4.

When the rectified DC voltage decreases to approximately 166 volts and the third common voltage $V_{CR3}$ decreases to approximately 31 volts at the fourth onset time t4*a* during the second quarter-cycle of each half-cycle, the voltage on the sensing node 532 in the third current regulator 180 is sufficient to deactivate the switching transistor 536, which unclamps the base of the output transistor 520 to allow the output transistor to provide the constant collector current having the third current magnitude I3 during the fourth conducting window T4.

At the fourth end time t4*b*, the rectified DC voltage $V_{RECT}$ is no longer sufficient to forward bias the LEDs in the first LED string 150, the second LED string 152 and the third LED string 154 connected in series. Thus, although the output transistor 520 in the third current regulator 180 continues to be biased in the active mode, no current flows through the third LED string to enable the LEDs in the third LED string to illuminate during the remainder of the second quarter-cycle.

As described above, the LED driver circuit 100 produces a current through the three LED strings 150, 152, 154 that increases and decreases in phase with the AC input voltage from the source 120. Thus, the LED driver circuit of FIG. 1 presents a load to the AC source having an effective power factor close to an ideal power factor of 1. In addition, the LED driver circuit does not require transformers, inductors and capacitors found in typical LED driver circuits. Accordingly, the LED driver circuit can be smaller and more economical to manufacture.

The LED driver circuit 100 also provides an overvoltage protection feature that results from the operational characteristics of the circuit. As described above, the third current regulator 180 disables current flow through the three LED strings 150, 152, 154 when the rectified DC voltage $V_{RECT}$ reaches the third upper threshold voltage V3*b*. The current $I_{LED}$ remains disabled until the rectified DC voltage has reached a peak and has decreased to the third upper threshold voltage V3*b*. If the rectified DC voltage surges beyond the peak voltage at the end of the quarter-cycle or if a voltage spike occurs at any time, the voltage sensing circuits within each of the three current regulators 160, 170, 180 will prevent any current from flowing when the magnitude of the rectified DC voltage exceeds the respective upper threshold voltage at which each current regulator disables current flow.

The LED driver circuit 100 of FIG. 1 is expandable to additional series-connected LED strings controlled by respective regulators. For example, FIG. 4 illustrates an LED driver circuit 600 having the AC source 120, the bridge 110, a first LED string (LEDS-1) 610, a second LED string (LEDS-2) 612, a third LED string (LEDS-3) 614, a fourth LED string (LEDS-4) 620, a fifth LED string (LEDS-5) 622, and a sixth LED string (LEDS-6) 624. Each LED string has a respective first (positive terminal (+)) and a respective second (negative terminal (−)). The six LED strings are electrically connected in series as before with the negative terminal of a first LED string connected to the positive terminal of the second LED string and so forth.

The negative terminal of each LED string is also connected to respective current regulator. The first LED string 610 is connected to a first terminal 642 of a first current regulator 640, which has a second terminal 644 connected to the ground reference 122. The second LED string 612 is connected to a first terminal 652 of a second current regulator 650, which has a second terminal 654 connected to the ground reference. The third LED string 614 is connected to a first terminal 662 of a third current regulator 660, which has a second terminal 664 connected to the ground reference. The fourth LED string 620 is connected to a first terminal 672 of a fourth current regulator 670, which has a second terminal 674 connected to the ground reference. The fifth LED string 622 is connected to a first terminal 682 of a fifth current regulator 680, which has a second terminal 684 connected to the ground reference. The sixth LED string 624 is connected to a first terminal 692 of a sixth current regulator 690, which has a second terminal 694 connected to the ground reference.

Each of the current regulators 640, 650, 660, 670, 680, 690 has a structure similar to the structures of the current regulators 160, 170, 180 of FIG. 1 with suitable modifications to the internal constant current source and the first and second sensing resistors within the current regulator to produce the respective current magnitudes and to implement different threshold voltages as described below.

As indicated in FIG. 4, the first current regulator 640 sinks a current having a magnitude I1. The second current regulator 650 sinks a current having a magnitude I2. The third current regulator 660 sinks a current having a magnitude I3. The fourth current regulator 670 sinks a current having a magnitude I4. The fifth current regulator 680 sinks a current having a magnitude I5. The sixth current regulator 690 sinks a current having a magnitude I6.

The sensing resistors within the first current regulator 640 monitor a first common voltage $V_{CR1}$ on the first terminal 642. The sensing resistors within the second current regulator 650 monitor a second common voltage $V_{CR2}$ on the first terminal 652. The sensing resistors within the third current regulator 660 monitor a third common voltage $V_{CR3}$ on the first terminal 662. The sensing resistors within the fourth current regulator 670 monitor a fourth common voltage $V_{CR4}$ on the first terminal 672. The sensing resistors within the fifth current regulator 680 monitor a fifth common voltage $V_{CR5}$ on the first terminal 682. The sensing resistors within the sixth current regulator 690 monitor a sixth common voltage $V_{CR6}$ on the first terminal 692. Each current regulator disables the respective current through the current regulator when the respective common voltage on the respective first terminal exceeds a value corresponding to a respective upper threshold voltage as the rectified DC voltage $V_{RECT}$ increases during the first quarter-cycle of each half-cycle. Each current regulator re-enables the respective current through the current regulator when the respective common voltage on the respective first terminal decreases to a value corresponding to a respective upper threshold voltage as the rectified DC voltage decreases during the second quarter-cycle of each half-cycle.

Figure 5:
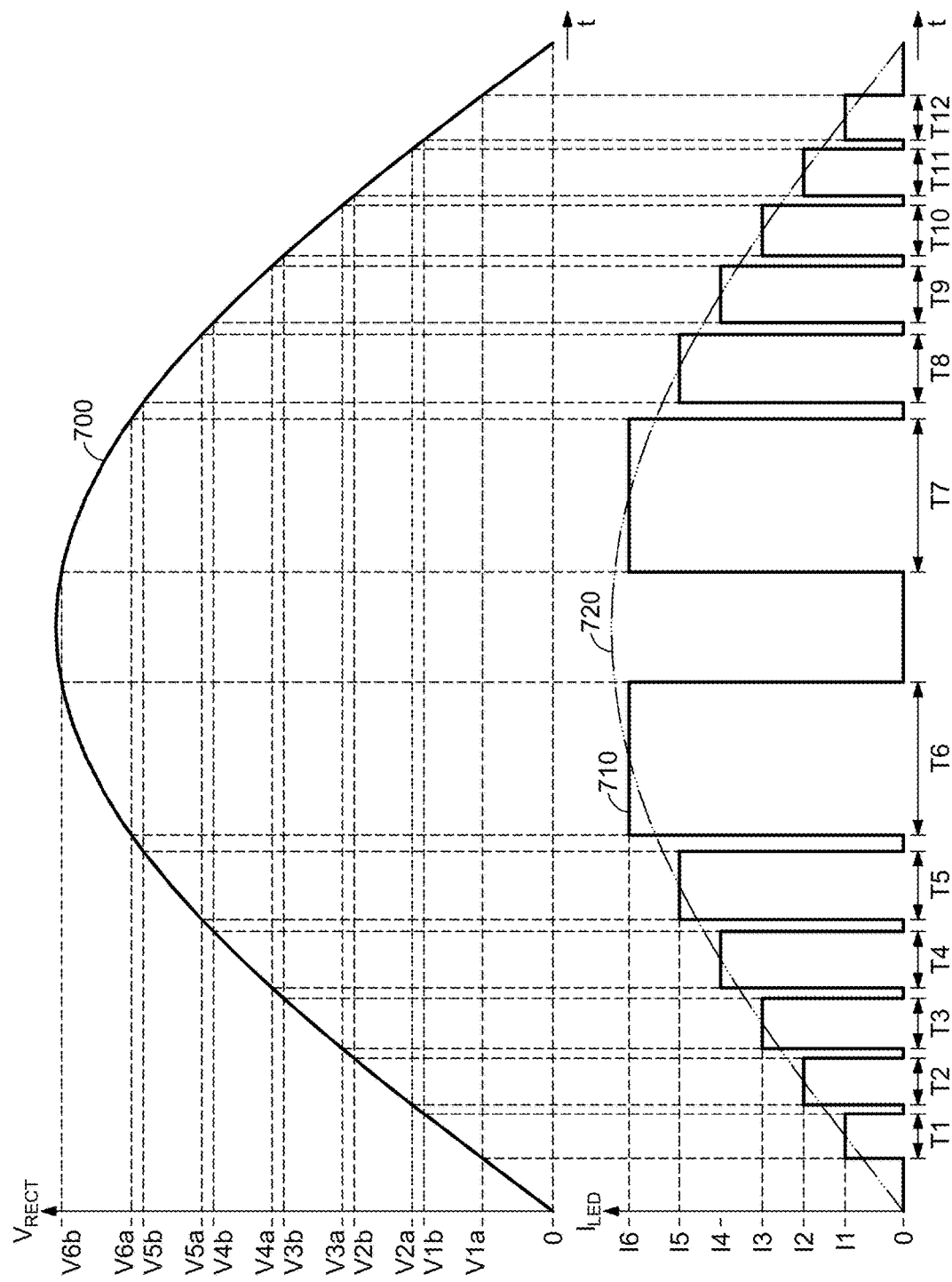
FIG. 5 illustrates the half-cycle of the rectified voltage waveform $V_{RECT}$ of FIG. 2 and illustrates one half-cycle of a current waveform $I_{LED}$ produced by the LED driver circuit of FIG. 4 in response to the half-cycle of the rectified voltage.

The foregoing description is illustrated by a pair of waveforms in FIG. 5. In FIG. 5, an upper waveform 700 represents one half-cycle of the rectified voltage waveform ($V_{RECT}$) 142 of FIG. 2 with six pairs of lower voltage thresholds and upper voltage thresholds identified. A lower waveform 710 represents one half-cycle of a current $I_{LED}$ produced by the LED driver circuit of FIG. 4 in response to the half-cycle of the rectified voltage. In the current waveform of FIG. 5, only the conducting windows and the magnitudes of the respective currents flowing during the conducting windows are labeled. The respective onset times and the respective end times occur at the beginning and end of each conducting window as before. The non-conducting windows occur at the beginning and at the end of each half-cycle and also occur between the conducting windows as previously described.

When the rectified DC voltage $V_{RECT}$ increases to a first lower threshold V1a, the diodes in the first LED string 610 are forward biased. Current flows through the first LED string during a first conducting window T1 with a magnitude I1 controlled by the first current regulator 640. The magnitude of the first common voltage $V_{CR1}$ on the first terminal 642 of the first current regulator remains lower than the rectified DC voltage by a difference corresponding to the forward voltage drop across the first LED string. When the rectified DC voltage increases to a first upper threshold V1b, the first current regulator senses the corresponding magnitude of the first common voltage $V_{CR1}$ and disables the current flow as described above to end the first conducting window T1.

When the rectified DC voltage $V_{RECT}$ increases to a second lower threshold V2a, the diodes in the second LED string 612 are forward biased along with the LEDs in the first LED string 610. Current flows through the first and second LED strings during a second conducting window T2 with a magnitude I2 controlled by the second current regulator 650. The magnitude of the second common voltage $V_{CR2}$ on the first terminal 652 of the second current regulator remains lower than the rectified DC voltage by a difference corresponding to the total of the forward voltage drops across the first and second LED strings. When the rectified DC voltage increases to a second upper threshold V2b, the second current regulator senses the corresponding magnitude of the second common voltage $V_{CR2}$ and disables the current flow as described above to end the second conducting window T2.

When the rectified DC voltage $V_{RECT}$ increases to a third lower threshold V3a, the diodes in the third LED string 614 are forward biased along with the LEDs in the first LED string 610 and the second LED string 612. Current flows through the first, second and third LED strings during a third conducting window T3 with a magnitude I3 controlled by the third current regulator 660. The magnitude of the third common voltage $V_{CR3}$ on the first terminal 662 of the third current regulator remains lower than the rectified DC voltage by a difference corresponding to the total of the forward voltage drops across the first, second and third LED strings. When the rectified DC voltage increases to a third upper threshold V3b, the third current regulator senses the corresponding magnitude of the third common voltage $V_{CR3}$ and disables the current flow as described above to end the third conducting window T3.

When the rectified DC voltage $V_{RECT}$ increases to a fourth lower threshold V4a, the diodes in the fourth LED string 620 are forward biased along with the LEDs in the first LED string 610, the second LED string 612 and the third LED string 614. Current flows through the first, second, third and fourth LED strings during a fourth conducting window T4 with a magnitude I4 controlled by the fourth current regulator 670. The magnitude of the fourth common voltage $V_{CR4}$ on the first terminal 672 of the fourth current regulator remains lower than the rectified DC voltage by a difference corresponding to the total of the forward voltage drops across the first, second, third and fourth LED strings. When the rectified DC voltage increases to a fourth upper threshold V4b, the fourth current regulator senses the corresponding magnitude of the fourth common voltage $V_{CR4}$ and disables the current flow as described above to end the fourth conducting window T4.

When the rectified DC voltage $V_{RECT}$ increases to a fifth lower threshold V5a, the diodes in the fifth LED string 622 are forward biased along with the LEDs in the first LED string 610, the second LED string 612, the third LED string 614 and the fourth LED string 620. Current flows through the first, second, third, fourth and fifth LED strings during a fifth conducting window T5 with a magnitude I5 controlled by the fifth current regulator 680. The magnitude of the fifth common voltage $V_{CR5}$ on the first terminal 682 of the fifth current regulator remains lower than the rectified DC voltage by a difference corresponding to the total of the forward voltage drops across the first, second, third, fourth and fifth LED strings. When the rectified DC voltage increases to a fifth upper threshold V5b, the fifth current regulator senses the corresponding magnitude of the fifth common voltage $V_{CR5}$ and disables the current flow as described above to end the fifth conducting window T5.

When the rectified DC voltage $V_{RECT}$ increases to a sixth lower threshold V6a, the diodes in the sixth LED string 624 are forward biased along with the LEDs in the first LED string 610, the second LED string 612, the third LED string 614, the fourth LED string 620 and the fifth LED string 622. Current flows through the first, second, third, fourth, fifth and sixth LED strings during a sixth conducting window T6 with a magnitude I6 controlled by the sixth current regulator 690. The magnitude of the sixth common voltage $V_{CR6}$ on the first terminal 692 of the sixth current regulator remains lower than the rectified DC voltage by a difference corresponding to the total of the forward voltage drops across the first, second, third, fourth, fifth and sixth LED strings. When the rectified DC voltage increases to a sixth upper threshold V6b, the sixth current regulator senses the corresponding magnitude of the sixth common voltage $V_{CR6}$ and disables the current flow as described above to end the sixth conducting window T6.

The operation of the LED driver circuit 600 is also generally symmetrical about the midpoint of each half-cycle of the rectified DC voltage $V_{RECT}$ as described above for the first LED driver circuit 100. As illustrated, the first through sixth LED strings 610, 612, 614, 620, 622, 624 conduct current with the magnitude I6 during a seventh conducting window T7 that starts when the rectified DC voltage decreases to the sixth upper threshold V6b. The seventh conducting window T7 ends when the rectified DC voltage decreases to the sixth lower threshold V6a and the sixth LED string is no longer forward biased.

The first through fifth LED strings 610, 612, 614, 620, 622 conduct current with the magnitude I5 during an eighth conducting window T6 that starts when the rectified DC voltage $V_{RECT}$ decreases to the fifth upper threshold V5b. The eighth conducting window T8 ends when the rectified DC voltage decreases to the fifth lower threshold V5a and the fifth LED string is no longer forward biased.

The first through fourth LED strings 610, 612, 614, 620 conduct current with the magnitude I4 during a ninth conducting window T9 that starts when the rectified DC voltage $V_{RECT}$ decreases to the fourth upper threshold V4b. The ninth conducting window T9 ends when the rectified DC voltage decreases to the fourth lower threshold V4a and the fourth LED string is no longer forward biased.

The first through third LED strings 610, 612, 614 conduct current with the magnitude I3 during a tenth conducting window T10 that starts when the rectified DC voltage $V_{RECT}$ decreases to the third upper threshold V3b. The tenth conducting window T10 ends when the rectified DC voltage decreases to the third lower threshold V3a and the third LED string is no longer forward biased.

The first and second LED strings 610, 612 conduct current with the magnitude I2 during an eleventh conducting window T11 that starts when the rectified DC voltage $V_{RECT}$ decreases to the second upper threshold V2b. The eleventh conducting window T11 ends when the rectified DC voltage decreases to the second lower threshold V2a and the second LED string is no longer forward biased.

The first LED string 610 conducts current with the magnitude I1 during a twelfth conducting window T12 that starts when the rectified DC voltage $V_{RECT}$ decreases to the first upper threshold V1b. The twelfth conducting window T12 ends when the rectified DC voltage decreases to the first lower threshold V1a and the first LED string is no longer forward biased.

The voltage waveform 700 and the current waveform 710 of FIG. 5 may be produced in one embodiment by selecting the number of LEDs in each of the six LED strings in the following manner. In one example, each of the LED string 610, 612, 614, 620, 622, 624 includes 8 LEDs such that the first lower threshold voltage V1a is 24 volts, the second lower threshold voltage V2a is 48 volts, the third lower threshold voltage V3a is 72 volts, the fourth lower threshold voltage V4a is 96 volts, the fifth lower threshold voltage V5a is 120 volts, and the sixth lower threshold voltage V6a is 144 volts. The first through fifth upper threshold voltages may be set approximately 4 volts below the second through sixth upper threshold voltages, respectively. For example, the first through fifth upper threshold voltages may be 44 volts, 68 volts, 92 volts, 116 volts and 140 volts, respectively. The sixth upper threshold voltage is set at a suitable voltage below the peak voltage of the AC input voltage (e.g., at approximately 168 volts in the illustrated embodiment). As stated before, all voltage magnitudes identified herein are by way of example and are not intended to be limiting.

As illustrated in FIG. 5, the $I_{LED}$ current waveform 710 during the twelve conducting windows T1-T12 forms an envelope having an overall shape—represented by a phantom line 720—that is similar to and in phase with the sinusoidal shape of the voltage waveform 700. By including more LED strings and respective current regulators, the current waveform more closely approximates a sinusoidal waveform than the current waveform 410 of FIG. 3.

The controlled currents I1, I2, I3, I4, I5, I6 are selected to provide a desired current envelope. For example, in the illustrated embodiment, the six currents are approximately 20 percent, 34 percent, 49 percent, 62 percent, 76 percent and 94 percent respectively of the maximum current through the LEDs in the LED strings.

One skilled in the art will appreciate that the foregoing structures and operations can be readily modified for different AC input voltages by scaling the voltages and selecting the lower threshold voltages corresponding to selected numbers of diodes in each of the LED strings. The structures and operations may also be modified to accommodate LEDs having different forward voltages and different maximum currents. Additional LED strings and current regulators may be provided to provide additional conducting windows to further control the shape of the overall current waveform.

The previous detailed description has been provided for the purposes of illustration and description. Thus, although there have been described particular embodiments of the present invention of a new and useful "AC LED Driver Circuit," it is not intended that such references be construed as limitations upon the scope of this invention except as set forth in the following claims.

What is claimed is:

1. A light-emitting diode (LED) driver circuit comprising:
a rectifier circuit configured to receive an AC voltage and produce between a voltage rail and a reference rail a rectified DC having a sinusoidal magnitude during each half-cycle of the AC voltage;
at least a first LED string comprising a first plurality of light-emitting diodes (LEDs) and a second LED string comprising a second plurality of LEDs, the first LED string having a respective first terminal connected to the voltage rail and having a respective second terminal, the second LED string having a respective first terminal connected to the second terminal of the first LED string and having a respective second terminal;
a first current regulator having a respective first terminal connected to the second terminal of the first LED string and having a respective second terminal connected to the reference rail,
the first current regulator configured, when the rectified DC voltage has a magnitude within a first voltage range, to enable a first current having a first current magnitude to flow from the second terminal of the first LED string to the reference rail, the first current flowing through the first LED string and not through the second LED string; and
a second current regulator having a respective first terminal connected to the second terminal of the second LED string and having a respective second terminal connected to the reference rail,
the second current regulator configured, when the rectified DC voltage has a magnitude within a second voltage range that is non-overlapping with respect to the first voltage range, to enable a second current having a second current magnitude to flow from the second terminal of the second LED string to the reference rail, the second current flowing through the first LED string and through the second LED string,
wherein when the magnitude of the rectified DC voltage is increasing, the first current regulator disables the first current through the first LED string before the second current regulator enables the second current through the first LED string and the second LED string.

2. The LED driver circuit of claim 1, wherein:
the first voltage range has a first voltage magnitude and a second voltage magnitude, the second voltage magnitude greater than the first voltage magnitude; and
the second voltage range has a third voltage magnitude and a fourth voltage magnitude, the fourth voltage magnitude greater than the third voltage magnitude, the third voltage magnitude greater than the second voltage magnitude of the first voltage range.

3. The LED driver circuit of claim 2, further comprising:
at least a third LED string, the third LED string comprising a third plurality of LEDs, the third LED string having a respective first terminal connected to the second terminal of the second LED string and having a respective second terminal; and
a third current regulator having a respective first terminal connected to the second terminal of the third LED string and having a respective second terminal connected to the reference rail,
the third current regulator configured, when the rectified DC voltage has a magnitude within a third voltage range, to enable a third current having a third current magnitude to flow from the second terminal of the third LED string to the reference rail, the third current flowing through the first LED string, the second LED string and the third LED string, wherein the third voltage range has a fifth voltage magnitude and a sixth voltage magnitude, the sixth voltage magnitude greater than the fifth voltage magnitude, the fifth voltage magnitude greater than the fourth voltage magnitude of the second voltage range.

4. The LED driver circuit of claim 1, wherein a lowest magnitude voltage in the second voltage range is greater than a highest voltage magnitude in the first voltage range.

5. The LED driver circuit of claim 4, further comprising:
at least a third LED string, the third LED string comprising a third plurality of LEDs, the third LED string having a respective first terminal connected to the second terminal of the second LED string and having a respective second terminal; and
a third current regulator having a respective first terminal connected to the second terminal of the third LED string and having a respective second terminal connected to the reference rail,
the third current regulator configured, when the rectified DC voltage has a magnitude within a third voltage range, to enable a third current to flow from the second terminal of the third LED string to the reference rail, the third current flowing through the first LED string, the second LED string and the third LED string, wherein a lowest voltage magnitude in the third voltage range is greater than a highest voltage magnitude in the second voltage range.

6. The LED driver circuit of claim 1, wherein the second current magnitude is greater than the first current magnitude.

7. The LED driver circuit of claim 6, further comprising:
at least a third LED string, the third LED string comprising a third plurality of LEDs, the third LED string having a respective first terminal connected to the second terminal of the second LED string and having a respective second terminal; and
a third current regulator having a respective first terminal connected to the second terminal of the third LED string and having a respective second terminal connected to the reference rail,
the third current regulator configured, when the rectified DC voltage has a magnitude within a third voltage range, to enable a third current having a third current magnitude to flow from the second terminal of the third LED string to the reference rail, the third current flowing through the first LED string, the second LED string and the third LED string, wherein the third current magnitude is greater than the second current magnitude.

8. The LED driver circuit of claim 1, further comprising:
at least a third LED string, the third LED string comprising a third plurality of LEDs, the third LED string having a respective first terminal connected to the second terminal of the second LED string and having a respective second terminal; and
a third current regulator having a respective first terminal connected to the second terminal of the third LED string and having a respective second terminal connected to the reference rail,
the third current regulator configured, when the rectified DC voltage has a magnitude within a third voltage range, to enable a third current having a third magnitude to flow from the second terminal of the third LED string to the reference rail, the third current flowing through the first LED string, the second LED string and the third LED string, wherein the second voltage range and the third voltage range are non-overlapping; and
when the magnitude of the rectified DC voltage is increasing, the second current regulator disables the second current before the third current regulator enables the third current.

9. The LED driver circuit of claim 1, further comprising:
at least a third LED string, the third LED string comprising a third plurality of LEDs, the third LED string having a respective first terminal connected to the second terminal of the second LED string and having a respective second terminal; and
a third current regulator having a respective first terminal connected to the second terminal of the third LED string and having a respective second terminal connected to the reference rail,
the third current regulator configured, when the rectified DC voltage has a magnitude within a third voltage range, to enable a third current to flow from the second terminal of the third LED string to the reference rail, the third current flowing through the first LED string, the second LED string and the third LED string.

10. The LED driver of claim 1, wherein the first current regulator comprises:
a first constant current source that provides a current substantially proportional to the first current magnitude;
a first transistor connected between the second terminal of the first LED string and the reference rail, the first transistor forming the output of a first current mirror, the first transistor coupled to an input of the first current mirror, the input of the first current mirror coupled to the first constant current source; and
a first voltage sensor coupled between the second terminal of the first LED string and the reference rail, the first voltage sensor having an output coupled to a control terminal of the first transistor,
the first voltage sensor configured to turn off the first transistor to cease the flow of the first current when the magnitude of the rectified DC voltage is greater than a highest voltage of the first voltage range.

11. The LED driver of claim 10, wherein the second current regulator comprises:
a second constant current source that provides a current substantially proportional to the second current magnitude;
a second transistor connected between the second terminal of the second LED string and the reference rail, the second transistor forming the output of a second current mirror, the second transistor coupled to an input of the second current mirror, the input of the second current mirror coupled to the second constant current source; and
a second voltage sensor coupled between the second terminal of the second LED string and the reference rail, the second voltage sensor having an output coupled to a control terminal of the second transistor,
the second voltage sensor configured to turn off the second transistor to cease the flow of the second current when the magnitude of the rectified DC voltage is greater than a highest voltage of the second voltage range.

12. The LED driver of claim 11, wherein the first constant current source is configured to provide a current substantially equal to the first current magnitude, and the second constant current source is configured to provide a current substantially equal to the second current magnitude.

13. A light-emitting diode (LED) driver circuit comprising:
- a rectifier circuit configured to receive an AC voltage and to produce a rectified DC voltage between a voltage rail and a reference rail, the rectified DC voltage varying sinusoidally between a minimum magnitude and a maximum magnitude during each half-cycle of the AC voltage;
- at least a first LED string, a second LED string and a third LED string, each LED string comprising a respective plurality of light-emitting diodes (LEDs), the first LED string having a respective first terminal connected to the voltage rail and having a respective second terminal, the second LED string having a respective first terminal connected to the second terminal of the first LED string and having a respective second terminal, the third LED string having a respective first terminal connected to the second terminal of the second LED string and having a respective second terminal;
- a first current regulator, a second current regulator and a third current regulator, each current regulator having a respective first terminal and a respective second terminal, each second terminal of each current regulator connected to the reference rail, the first terminal of the first current regulator connected to the second terminal of the first LED string, the first terminal of the second current regulator connected to the second terminal of the second LED string, and the first terminal of the third current regulator connected to the second terminal of the third LED string,
- wherein the first current regulator includes a first current source and is responsive to the rectified DC voltage having a magnitude within a first voltage range to cause a first current having a first current magnitude to flow through the first LED string, wherein the first current magnitude is responsive to a current from the first constant current source,
- the second current regulator includes a second current source and is responsive to the rectified DC voltage having a magnitude within a second voltage range to cause a second current having a second current magnitude to flow through the first LED string and through the second LED string, wherein the second current magnitude is responsive to a current from the second constant current source, and
- the third current regulator includes a third constant current source and is responsive to the rectified DC voltage having a magnitude within a third voltage range to cause a third current having a third current magnitude to flow through the first LED string, through the second LED string, and through the third LED string, wherein the third current magnitude is responsive to a current from the third constant current source,
- the first voltage range has a first lower voltage magnitude and a first upper voltage magnitude, the second voltage range has a second lower voltage magnitude and a second upper voltage magnitude, the second lower voltage magnitude greater than the first upper voltage magnitude, the third voltage range has a third lower voltage magnitude and a third upper voltage magnitude, the third lower voltage magnitude greater than the second upper voltage magnitude, and the second current magnitude is greater than the first current magnitude, and the third current magnitude is greater than the second current magnitude.

14. A light-emitting diode (LED) driver circuit comprising:
- a rectifier circuit configured to receive an AC voltage and produce between a voltage rail and a reference rail a rectified DC having a sinusoidal magnitude during each half-cycle of the AC voltage;
- at least a first LED string comprising a first plurality of light-emitting diodes (LEDs) and a second LED string comprising a second plurality of LEDs, the first LED string having a respective first terminal connected to the voltage rail and having a respective second terminal, the second LED string having a respective first terminal connected to the second terminal of the first LED string and having a respective second terminal;
- a first current regulator comprising
  - a first constant current source that provides a current substantially proportional to the first current magnitude,
  - a first transistor connected between the second terminal of the first LED string and the reference rail, the first transistor forming the output of a first current mirror, the first transistor coupled to an input of the first current mirror, the input of the first current mirror coupled to the first constant current source, and
  - a first voltage sensor coupled between the second terminal of the first LED string and the reference rail, the first voltage sensor having an output coupled to a control terminal of the first transistor,
- the first current regulator is configured, when the rectified DC voltage has a magnitude within a first voltage range, to enable a first current having a first current magnitude to flow from the second terminal of the first LED string to the reference rail, the first current flowing through the first LED string and not through the second LED string;
- the first voltage sensor is configured to turn off the first transistor to cease the flow of the first current when the magnitude of the rectified DC voltage is greater than a highest voltage of the first voltage range; and
- a second current regulator having a respective first terminal connected to the second terminal of the second LED string and having a respective second terminal connected to the reference rail, the second current regulator configured, when the rectified DC voltage has a magnitude within a second voltage range, to enable a second current having a second current magnitude to flow from the second terminal of the second LED string to the reference rail, the second current flowing through the first LED string and through the second LED string.

15. The LED driver of claim 14, wherein the second current regulator comprises:
- a second constant current source that provides a current substantially proportional to the second current magnitude;
- a second transistor connected between the second terminal of the second LED string and the reference rail, the second transistor forming the output of a second current mirror, the second transistor coupled to an input of the second current mirror, the input of the second current mirror coupled to the second constant current source; and
- a second voltage sensor coupled between the second terminal of the second LED string and the reference rail, the second voltage sensor having an output coupled to a control terminal of the second transistor, the second voltage sensor configured to turn off the second transistor to cease the flow of the second current when the magnitude of the rectified DC voltage is greater than a highest voltage of the second voltage range.

16. The LED driver of claim 15, wherein the first constant current source is configured to provide a current substantially equal to the first current magnitude, and the second constant current source is configured to provide a current substantially equal to the second current magnitude.

17. The LED driver circuit of claim 14, wherein:
the first voltage range has a first voltage magnitude and a second voltage magnitude, the second voltage magnitude greater than the first voltage magnitude; and
the second voltage range has a third voltage magnitude and a fourth voltage magnitude, the fourth voltage magnitude greater than the third voltage magnitude, the third voltage magnitude greater than the second voltage magnitude of the first voltage range.

18. The LED driver circuit of claim 17, further comprising:
at least a third LED string, the third LED string comprising a third plurality of LEDs, the third LED string having a respective first terminal connected to the second terminal of the second LED string and having a respective second terminal; and
a third current regulator having a respective first terminal connected to the second terminal of the third LED string and having a respective second terminal connected to the reference rail,
the third current regulator configured, when the rectified DC voltage has a magnitude within a third voltage range, to enable a third current having a third current magnitude to flow from the second terminal of the third LED string to the reference rail, the third current flowing through the first LED string, the second LED string and the third LED string, wherein the third voltage range has a fifth voltage magnitude and a sixth voltage magnitude, the sixth voltage magnitude greater than the fifth voltage magnitude, the fifth voltage magnitude greater than the fourth voltage magnitude of the second voltage range.

19. The LED driver circuit of claim 14, wherein a lowest magnitude voltage in the second voltage range is greater than a highest voltage magnitude in the first voltage range.

20. The LED driver circuit of claim 19, further comprising:
at least a third LED string, the third LED string comprising a third plurality of LEDs, the third LED string having a respective first terminal connected to the second terminal of the second LED string and having a respective second terminal; and
a third current regulator having a respective first terminal connected to the second terminal of the third LED string and having a respective second terminal connected to the reference rail,
the third current regulator configured, when the rectified DC voltage has a magnitude within a third voltage range, to enable a third current to flow from the second terminal of the third LED string to the reference rail, the third current flowing through the first LED string, the second LED string and the third LED string, wherein a lowest voltage magnitude in the third voltage range is greater than a highest voltage magnitude in the second voltage range.

* * * * *